United States Patent
Chen et al.

(10) Patent No.: US 11,671,613 B2
(45) Date of Patent: Jun. 6, 2023

(54) METHODS FOR SIGNALING VIRTUAL BOUNDARIES AND WRAP-AROUND MOTION COMPENSATION

(71) Applicant: ALIBABA GROUP HOLDING LIMITED, Grand Cayman (KY)

(72) Inventors: Jie Chen, Beijing (CN); Ru-Ling Liao, Beijing (CN); Yan Ye, San Diego, CA (US); Jiancong Luo, Skillman, NJ (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/130,791

(22) Filed: Dec. 22, 2020

(65) Prior Publication Data
US 2021/0203972 A1    Jul. 1, 2021

Related U.S. Application Data

(60) Provisional application No. 62/954,828, filed on Dec. 30, 2019.

(51) Int. Cl.
*H04N 19/46*    (2014.01)
*H04N 19/105*   (2014.01)
(Continued)

(52) U.S. Cl.
CPC ........... *H04N 19/46* (2014.11); *H04N 19/105* (2014.11); *H04N 19/132* (2014.11); *H04N 19/177* (2014.11); *H04N 19/80* (2014.11)

(58) Field of Classification Search
CPC .... H04N 19/46; H04N 19/105; H04N 19/132; H04N 19/177; H04N 19/80
See application file for complete search history.

(56) References Cited

U.S. PATENT DOCUMENTS

2014/0362910 A1* 12/2014 Seregin ................ H04N 19/105
                                                        375/240.12
2017/0310961 A1* 10/2017 Liu ....................... H04N 19/573
(Continued)

FOREIGN PATENT DOCUMENTS

CN      105247867 A    1/2016
CN      106797229 A    5/2017
(Continued)

OTHER PUBLICATIONS

"Requirements for a Future Video Coding Standard v5," International Organisation for Standardisation, Torino, IT, 14 pages (2017).
(Continued)

*Primary Examiner* — Tat C Chio
(74) *Attorney, Agent, or Firm* — Finnegan, Henderson, Farabow, Garrett & Dunner, LLP

(57) ABSTRACT

The present disclosure provides methods for picture processing. The method can include: receiving a bitstream comprising a set of pictures; determining, according to the received bitstream, whether a virtual boundary is signaled at a sequence level for the set of pictures; in response to the virtual boundary being signaled at the sequence level, determining a position of the virtual boundary for the set of pictures, the position being bounded by a range signaled in the received bitstream; and disabling in-loop filtering operations across the virtual boundary.

13 Claims, 17 Drawing Sheets

(51) Int. Cl.
*H04N 19/177* (2014.01)
*H04N 19/80* (2014.01)
*H04N 19/132* (2014.01)

(56) References Cited

U.S. PATENT DOCUMENTS

2017/0366808 A1    12/2017  Lin et al.
2019/0215532 A1*    7/2019  He .................. H04N 13/117

FOREIGN PATENT DOCUMENTS

| CN | 109417632 A | 3/2019 | |
|---|---|---|---|
| EP | 4060996 A1 | 9/2022 | |
| WO | WO 2019/060443 A1 | 3/2019 | |
| WO | WO-2019060443 A1 * | 3/2019 | ........... H04N 19/593 |
| WO | WO 2019/162230 A1 | 8/2019 | |
| WO | WO-2021118293 A1 * | 6/2021 | |

OTHER PUBLICATIONS

Bross et al., "Versatile Video Coding (Draft 7)," JVET-P2001-vE, 16$^{th}$ Meeting: Geneva, CH, Oct. 1-11, 2019, 491 pages.
Chen et al., "Algorithm description for Versatile Video Coding and Test Model 7 (VTM 7)," JVET-P002-V1, 16$^{th}$ Meeting: Geneva, CH, Oct. 1-11, 2019, 90 pages.
Chen et al., "Algorithm Description of Joint Exploration Test Model 7 (JEM 7)," JVET-G1001-v1, 7$^{th}$ Meeting: Torino, IT, Jul. 13-21, 2017, 50 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Sullivan et al., "Overview of the High Efficiency Video Coding (HEVC) Standard," IEE Transactions on Circuits and Systems for Video Technology, vol. 22, No. 12, pp. 1649-1668 (2012).
PCT International Search Report and Written Opinion dated Mar. 9, 2021, issued in corresponding International Application No. PCT/US2020/066569 (16 pgs.).
First Search Report issued in corresponding Chinese Application No. 202080086150.2 dated Sep. 9, 2022 (2 pages).
European Patent Office Communication issued for Application No. 20910544.4 the Supplementary European Search Report (Art. 153(7) EPC) and the European search opinion dated Mar. 15, 2023, 12 pages.
Chen et al., "AHG8/AHG9: On SPS level virtual boundary," JVET-Q0417-V1, 17$^{th}$ Meeting: Brussels, BE, Jan. 7-17, 2020, 8 pages.
Heng et al.," AHG8: Disabling reference wraparound for reference picture resampling," JVET-Q0134-v1, 17$^{th}$ Meeting: Brussels, BE Jan. 7-17, 2020, 2 pages.

* cited by examiner

Table 1: Exemplary SPS Syntax For Virtual Boundary

| seq_parameter_set_rbsp( ) { | Descriptor |
|---|---|
| .... | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |

*FIG. 5*

Table 2: Exemplary PH Syntax For Virtual Boundary

| picture_header_rbsp( ) { | Descriptor |
|---|---|
| ... | |
|   if( !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |

*FIG. 6*

Exemplary horizontal wrap-around motion compensation for ERP

Exemplary horizontal wrap around motion compensation for PERP

Table 3: Exemplary syntax for wrap-around motion compensation

| seq_parameter_set_rbsp( ) { | Descriptor |
|---|---|
| ... | |
|   sps_ref_wraparound_enabled_flag | u(1) |
|   if( sps_ref_wraparound_enabled_flag ) | |
|     sps_ref_wraparound_offset_minus1 | ue(v) |
| ... | u(1) |

*FIG. 8*

Table 4: Exemplary SPS syntax for signaling maximum values of picture width and height

| seq_parameter_set_rbsp( ) { | Descriptor |
|---|---|
| ... | |
| ref_pic_resampling_enabled_flag | u(1) |
| pic_width_max_in_luma_samples | ue(v) |
| pic_height_max_in_luma_samples | ue(v) |
| ... | u(2) |

*FIG. 9*

Table 5: Exemplary PPS syntax for signaling picture width and height

| pic_parameter_set_rbsp( ) { | Descriptor |
|---|---|
| ... | |
| pic_width_in_luma_samples | ue(v) |
| pic_height_in_luma_samples | ue(v) |
| ... | |

*FIG. 10*

Table 6: Exemplary SPS syntax

| seq_parameter_set_rbsp( ) { | Descriptor |
|---|---|
| ... | |
|   ref_pic_resampling_enabled_flag | u(1) |
| .... | |
|   *if(ref_pic_resampling_enabled_flag){* | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |

*FIG. 11*

Table 7: Exemplary SPS Syntax

| seq_parameter_set_rbsp( ) { | Descriptor |
|---|---|
| ... | |
| ~~ref_pic_resampling_enabled_flag~~ | ~~u(1)~~ |
| .... | |
| sps_virtual_boundaries_present_flag | |
| if( sps_virtual_boundaries_present_flag ) { | u(1) |
| sps_num_ver_virtual_boundaries | |
| for( i = 0; i < sps_num_ver_virtual_boundaries; i++ ) | u(2) |
| sps_virtual_boundaries_pos_x[ i ] | |
| sps_num_hor_virtual_boundaries | u(13) |
| for( i = 0; i < sps_num_hor_virtual_boundaries; i++ ) | u(2) |
| sps_virtual_boundaries_pos_y[ i ] | |
| } | u(13) |
| ... | |
| *if(!sps_virtual_boundaries_present_flag)* | |
| *ref_pic_resampling_enabled_flag* | u(1) |

*FIG. 12*

Table 8: Exemplary SPS Syntax

| seq_parameter_set_rbsp( ) { | Descriptor |
|---|---|
| ... | |
|   ref_pic_resampling_enabled_flag | u(1) |
| .... | |
|   *if( ref_pic_resampling_enabled_flag ){* | |
|   sps_ref_wraparound_enabled_flag | u(1) |
|   if( sps_ref_wraparound_enabled_flag ) | |
|     sps_ref_wraparound_offset_minus1 | ue(v) |
|   } | |

*FIG. 13*

Table 9: Exemplary SPS Syntax

| seq_parameter_set_rbsp( ) { | Descriptor |
|---|---|
| ... | |
| ~~ref_pic_resampling_enabled_flag~~ | ~~u(1)~~ |
| .... | |
| sps_ref_wraparound_enabled_flag | u(1) |
| if( sps_ref_wraparound_enabled_flag ) | |
| sps_ref_wraparound_offset_minus1 | ue(v) |
| ... | |
| *if(!sps_ref_wraparound_enabled_flag)* | |
| *ref_pic_resampling_enabled_flag* | u(1) |

*FIG. 14*

METHODS FOR SIGNALING VIRTUAL BOUNDARIES AND WRAP-AROUND MOTION COMPENSATION

CROSS-REFERENCE TO RELATED APPLICATIONS

The present disclosure claims priority to U.S. provisional application No. 62/954,828, filed on Dec. 30, 2019, which is incorporated herein by reference in its entirety.

TECHNICAL FIELD

The present disclosure generally relates to video processing, and more particularly, to methods for signaling virtual boundaries and wrap-around motion compensation.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The present disclosure provides methods for picture processing. The method can include: receiving a bitstream comprising a set of pictures; determining, according to the received bitstream, whether a virtual boundary is signaled at a sequence level for the set of pictures; in response to the virtual boundary being signaled at the sequence level, determining a position of the virtual boundary for the set of pictures, the position being bounded by a range signaled in the received bitstream; and disabling in-loop filtering operations across the virtual boundary.

The embodiments of the present disclosure further provide an apparatus for picture processing. The apparatus can include a memory storing a set of instructions; and one or more processors configured to execute the set of instructions to cause the apparatus to perform: receiving a bitstream comprising a set of pictures; determining, according to the received bitstream, whether a virtual boundary is signaled at a sequence level for the set of pictures; in response to the virtual boundary being signaled at the sequence level, determining a position of the virtual boundary for the set of pictures, the position being bounded by a range signaled in the received bitstream; and disabling in-loop filtering operations across the virtual boundary.

The embodiments of the present disclosure further provide a non-transitory computer readable medium that stores a set of instructions that is executable by at least one processor of a computer to cause the computer to perform a picture processing method, the method comprising: receiving a bitstream comprising a set of pictures; determining, according to the received bitstream, whether a virtual boundary is signaled at a sequence level for the set of pictures; in response to the virtual boundary being signaled at the sequence level, determining a position of the virtual boundary for the set of pictures, the position being bounded by a range signaled in the received bitstream; and disabling in-loop filtering operations across the virtual boundary.

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 illustrates an exemplary sequence parameter set (SPS) syntax for signaling virtual boundary, consistent with some embodiments of the disclosure.

FIG. 6 illustrates an exemplary picture header (PH) syntax for signaling virtual boundary, consistent with some embodiments of the disclosure.

FIG. 8 illustrates an exemplary syntax for wrap-around motion compensation, consistent with some embodiments of the disclosure.

FIG. 9 illustrates an exemplary SPS syntax for signaling maximum values of picture width and height, consistent with some embodiments of the disclosure.

FIG. 10 illustrates an exemplary syntax for signaling wrap-around motion compensation, consistent with some embodiments of the disclosure.

FIG. 11 illustrates an exemplary SPS syntax for signaling virtual boundaries, consistent with some embodiments of the disclosure.

FIG. 12 illustrates another exemplary SPS syntax for signaling virtual boundaries, consistent with some embodiments of the disclosure.

FIG. 13 illustrates an exemplary SPS syntax for signaling wrap-around motion compensation, consistent with some embodiments of the disclosure.

FIG. 14 illustrates another exemplary SPS syntax for signaling wrap-around motion compensation, consistent with some embodiments of the disclosure.

DETAILED DESCRIPTION

Figure 1:
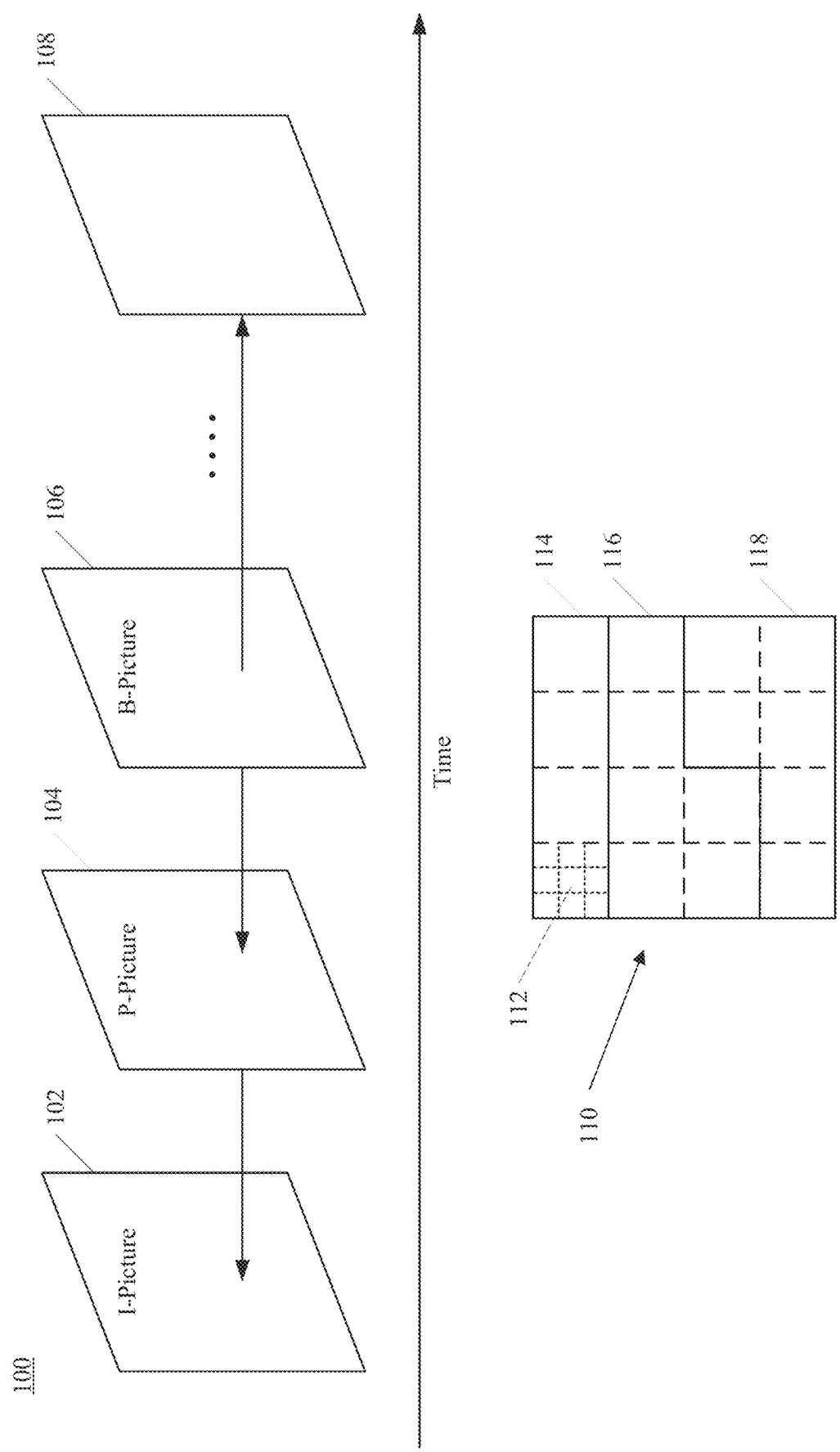
FIG. 1 illustrates structures of an example video sequence, according to some embodiments of this disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. Particular aspects of the present disclosure are described in greater detail below. The terms and definitions provided herein control, if in conflict with terms and/or definitions incorporated by reference.

As stated above, video is frames arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") includes changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard continues to include more coding technologies that provide better compression performance. VVC is based on the same hybrid video coding system that has been used in modern video compression standards such as HEVC, H.264/AVC, MPEG2, H.263, etc. In applications like 360-degree video, the layout for a specific projection format usually has multiple faces. For example, MPEG-I part 2: omni-directional media format (OMAF) standardizes Cube-map based projection format named CMP which has six faces. And for those projection formats including a plurality of faces, no matter what kind of compact frame packing arrangement is used, discontinuities appear between two or more adjacent faces in the frame packed picture. If in-loop filtering operations are performed across this discontinuity, face seam artifacts may become visible in the reconstructed video after rendering. To alleviate face seam artifacts, in-loop filtering operations have to be disabled across discontinuities in the frame-packed picture. A virtual boundary can be set as one of the coding tools for 360-degree video such that in-loop filtering can be disabled across the virtual boundary to prevent from artifacts.

FIG. 1 illustrates structures of an example video sequence 100, according to some embodiments of this disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4-4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as $128x$ 128, 64×64, 32×32, 16'16, 4-8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
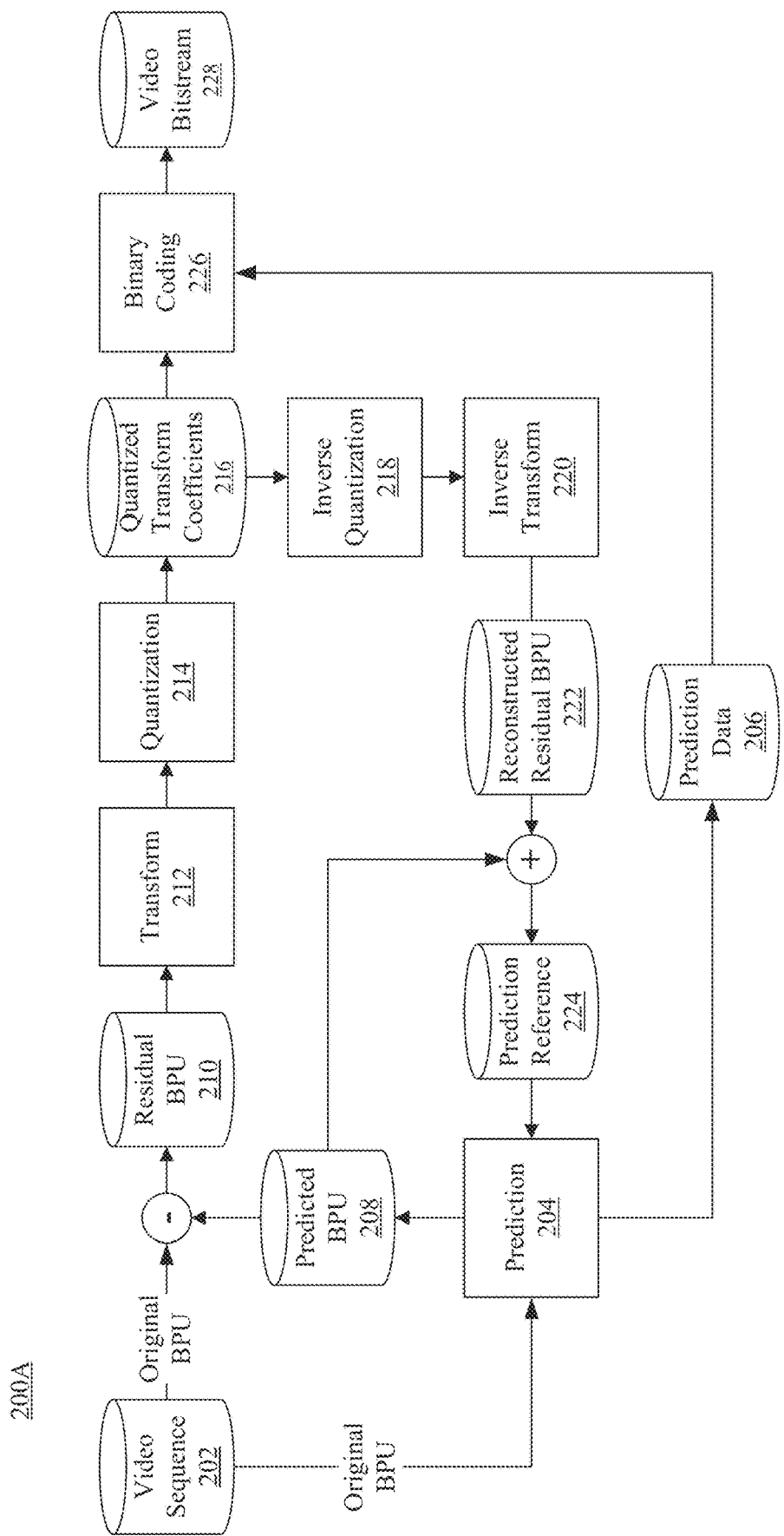
FIG. 2A illustrates a schematic diagram of an exemplary encoding process of a hybrid video coding system, consistent with some embodiments of the disclosure.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
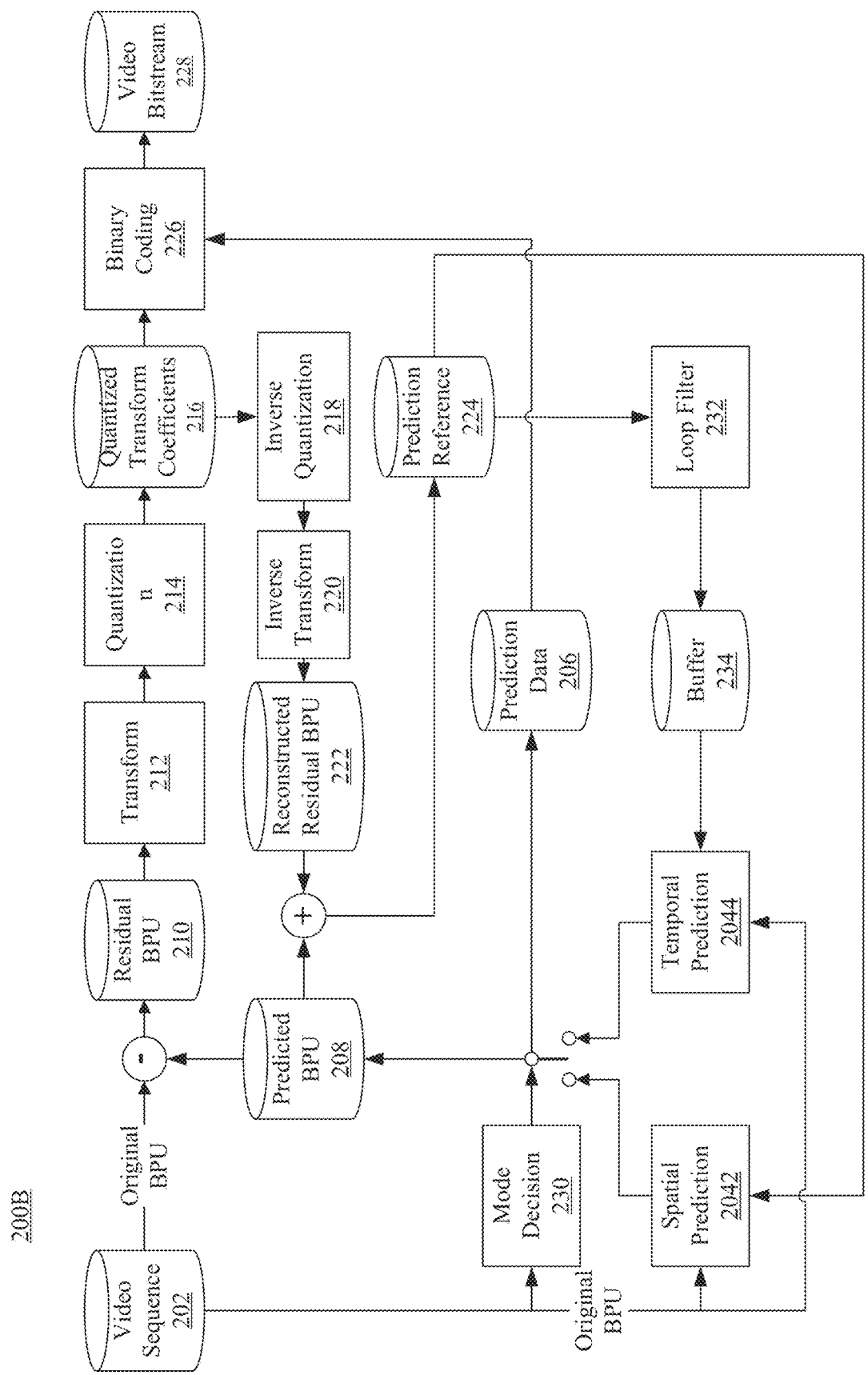
FIG. 2B illustrates a schematic diagram of another exemplary encoding process of a hybrid video coding system, consistent with some embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG.

1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
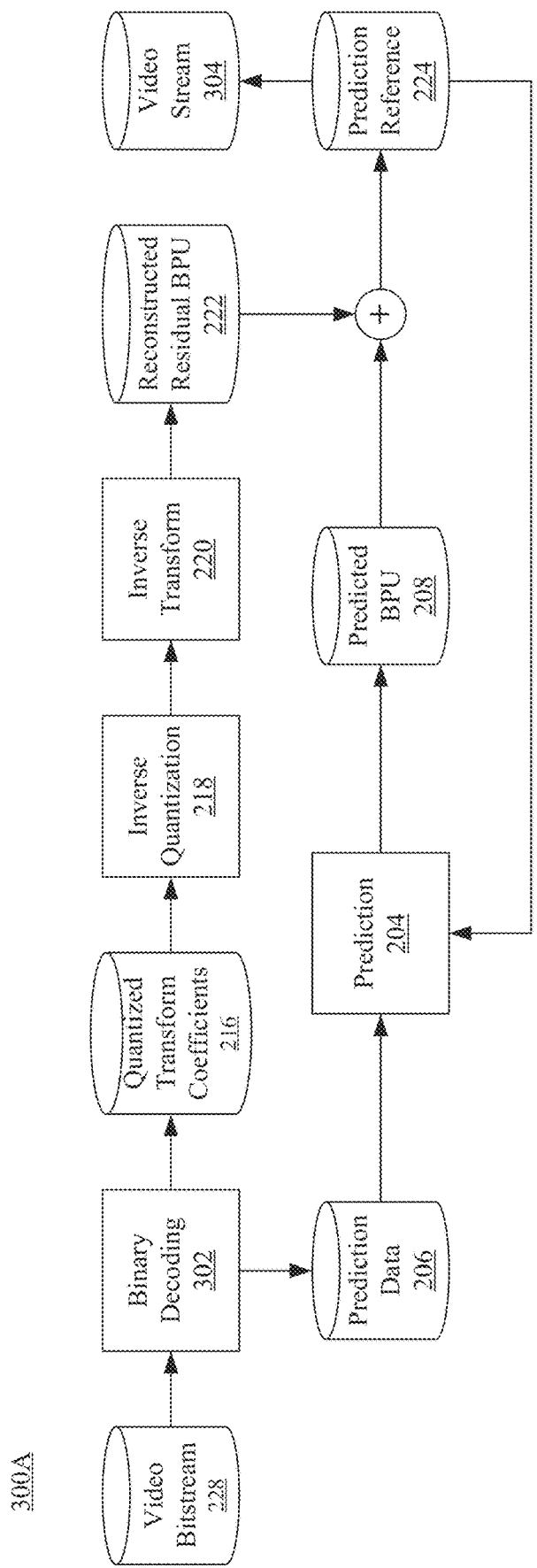
FIG. 3A illustrates a schematic diagram of an exemplary decoding process of a hybrid video coding system, consistent with some embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
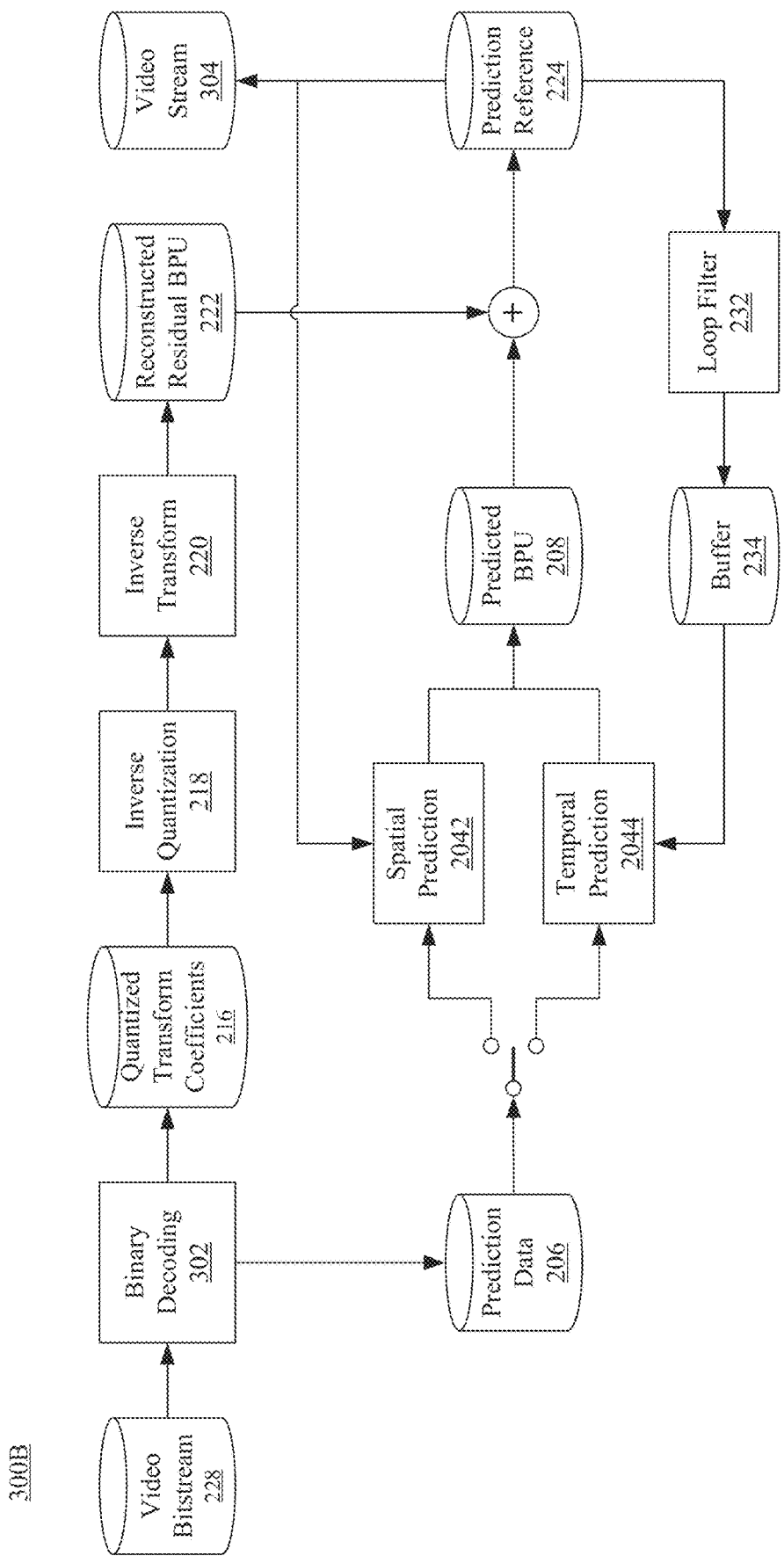
FIG. 3B illustrates a schematic diagram of another exemplary decoding process of a hybrid video coding system, consistent with some embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
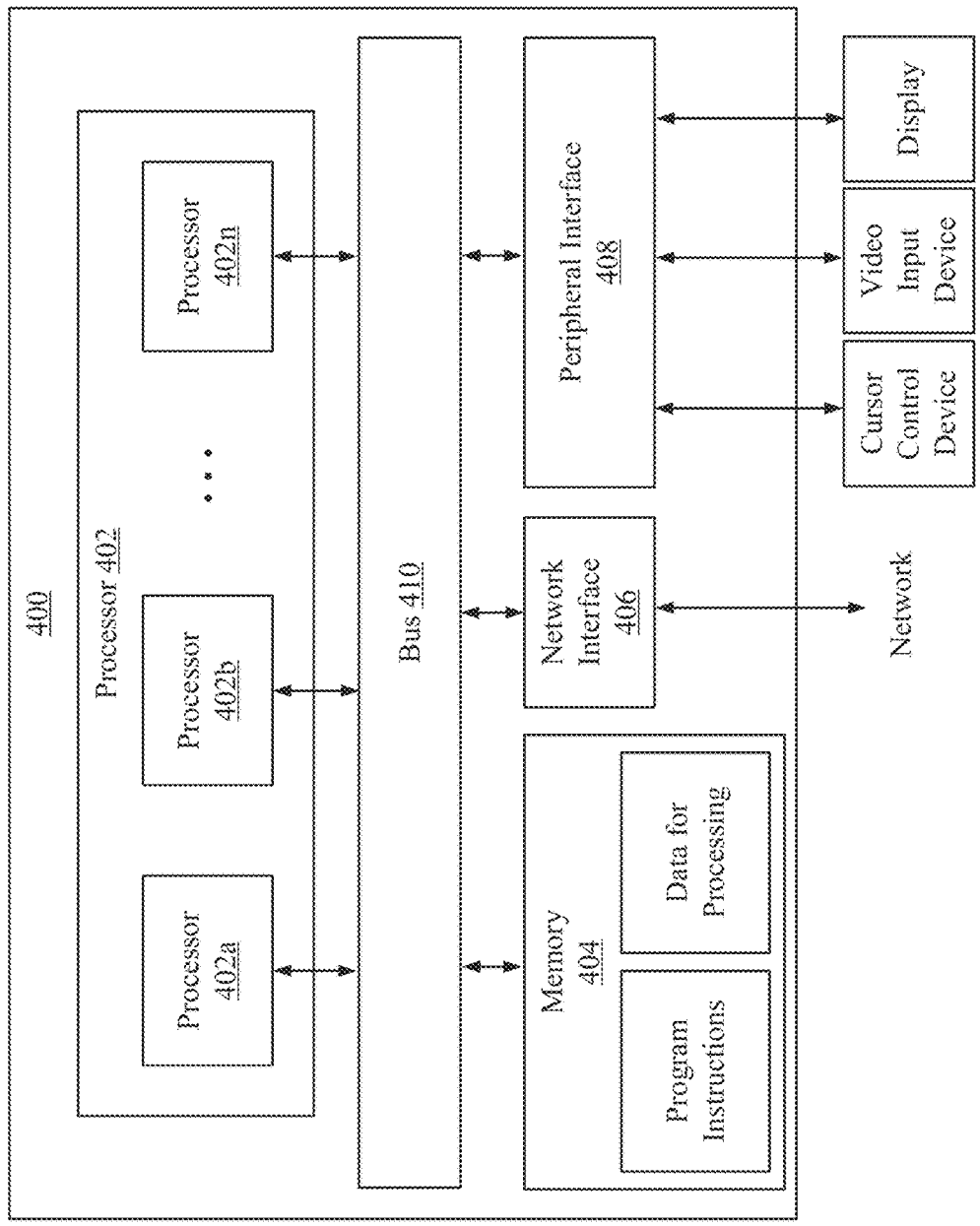
FIG. 4 illustrates a block diagram of an exemplary apparatus for encoding or decoding a video, consistent with some embodiments of the disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4A, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

According to the disclosed embodiments, several coding tools can be used to code 360-degree video or gradual decoding refresh (GDR). Virtual boundary is one of these coding tools. In applications like 360-degree video, the layout for a specific projection format usually has multiple faces. For example, MPEG-I part 2: omni-directional media format (OMAF) standardizes Cube-map based projection format named CMP which has six faces. And for those projection formats including a plurality of faces, no matter what kind of compact frame packing arrangement is used, discontinuities appear between two or more adjacent faces in the frame packed picture. If in-loop filtering operations are performed across this discontinuity, face seam artifacts may become visible in the reconstructed video after rendering. To alleviate face seam artifacts, in-loop filtering operations have to be disabled across discontinuities in the frame-packed picture. Thus, consistent with the disclosed embodiments, a concept called virtual boundary can be used across which the loop filtering operation is disabled. An encoder may set the discontinued boundary as a virtual boundary, and thus no loop filter can be applied on the discontinued boundary. The position of the virtual boundary is signaled in the bitstream, and the encoder may change the virtual boundary position according to the current projection format.

Other than the 360-degree video, the virtual boundary may also be used for gradual decoding refresh (GDR), which is mainly used in the very-low-delay application. In the very-low-delay application, inserting an intra coded picture as a random access point picture may cause unacceptable transmission latency due to the big size of the intra coded picture. To reduce the latency, GDR is adopted in which the pictures are refreshed progressively by inserting intra-coded regions in B/P-pictures. To prevent error propagation, the pixels in refreshed region in a picture cannot refer to the those in the un-refreshed region of the current picture or reference picture. Therefore, the loop filtering cannot be applied across the boundary of refreshed region and un-freshed region. With the above virtual boundary scheme, the encoder may set the boundary of refreshed region and un-refreshed region as a virtual boundary, and then no loop filtering operation can be applied across this boundary.

According to some embodiments, the virtual boundary can be signaled in a Sequence Parameter Set (SPS) or a Picture Header (PH). The Picture Header conveys information for a particular picture and contains information that is common to all slices that belong to the same picture. The PH can contain information related to virtual boundaries. One PH is set for each picture. The Sequence Parameter Set contains syntax elements pertaining to a coded layer video sequence (CLVS). The SPS contains sequence-level information shared by all pictures in an entire coded layer video sequence (CLVS) and can provide a big picture of what a bitstream contains and how the information in the bitstream can be used. In SPS, a virtual boundary present flag "sps_virtual_boundaries_present_flag" is signaled first. If the flag is true, then a number of virtual boundaries and the position of each virtual boundary are signaled for pictures referring to the SPS. If "sps_virtual_boundaries_present_flag" is false, then in PH, another virtual boundary present flag "ph_virtual_boundaries_present_flag" can be signaled. Similarly, if "ph_virtual_boundaries_present_flag" is true, the number of virtual boundaries and the position of each virtual boundary can be signaled for the picture associated with the PH.

The SPS syntax of virtual boundary is shown in Table 1 of FIG. 5. Semantics of the SPS syntax in FIG. 5 are given as below.

"sps_virtual_boundaries_present_flag" equal to 1 specifies that information of virtual boundaries is signalled in the SPS. "sps_virtual_boundaries_present_flag" equal to 0 specifies that information of virtual boundaries is not signalled in the SPS. When there are one or more virtual boundaries signalled in the SPS, the in-loop filtering operations are disabled across the virtual boundaries in pictures referring to the SPS. In-loop filtering operations include the deblocking filter, sample adaptive offset filter, and adaptive loop filter operations.

"sps_num_ver_virtual_boundaries" specifies the number of "sps_virtual_boundaries_pos_x[i]" syntax elements that are present in the SPS. When "sps_num_ver_virtual_boundaries" is not present, it is inferred to be equal to 0.

"sps_virtual_boundaries_pos_x[i]" specifies the location of the i-th vertical virtual boundary in units of luma samples divided by 8. The value of "sps_virtual_boundaries_pos_x[i]" is in the range of 1 to Ceil(pic_width_in_luma_samples÷8)−1, inclusive.

"sps_num_hor_virtual_boundaries" specifies the number of "sps_virtual_boundaries_pos_y[i]" syntax elements that are present in the SPS. When "sps_num_hor_virtual_boundaries" is not present, it is inferred to be equal to 0.

"sps_virtual_boundaries_pos_y[i]" specifies the location of the i-th horizontal virtual boundary in units of luma samples divided by 8. The value of "sps_virtual_boundaries_pos_y[i]" is in the range of 1 to Ceil(pic_height_in_luma_samples÷8)−1, inclusive.

PH syntax of virtual boundary is shown in Table 2 of FIG. 6. The semantics of PH syntax in FIG. 6 are given below.

"ph_num_ver_virtual_boundaries" specifies the number of "ph_virtual_boundaries_pos_x[i]" syntax elements that are present in the PH. When "ph_num_ver_virtual_boundaries" is not present, it is inferred to be equal to 0.

The parameter VirtualBoundariesNumVer is derived as follows:
VirtualBoundariesNumVer=sps_virtual_boundaries_present_flag?
sps_num_ver_virtual_boundaries:ph_num_ver_virtual_boundaries "ph_virtual_boundaries_pos_x[i]" specifies the location of the i-th vertical virtual boundary in units of luma samples divided by 8. The value of "ph_virtual_boundaries_pos_x[i]" is in the range of 1 to Ceil(pic_width_in_luma_samples÷8)−1, inclusive.

The location of the vertical virtual boundary "VirtualBoundariesPosX[i]" in units of luma samples is derived as follows:
VirtualBoundariesPosX[i]=(sps_virtual_boundaries_present_flag?
sps_virtual_boundaries_pos_x[i]:ph_virtual_boundaries_pos_x[i])*8

The distance between any two vertical virtual boundaries may be greater than or equal to CtbSizeY luma samples.

"ph_num_hor_virtual_boundaries" specifies the number of "ph_virtual_boundaries_pos_y[i]" syntax elements that are present in the PH. When "ph_num_hor_virtual_boundaries" is not present, it is inferred to be equal to 0.

The parameter VirtualBoundariesNumHor is derived as follows:
VirtualBoundariesNumHor=sps_virtual_boundaries_present_flag?
sps_num_hor_virtual_boundaries:ph_num_hor_virtual_boundaries.

"ph_virtual_boundaries_pos_y[i]" specifies the location of the i-th horizontal virtual boundary in units of luma samples divided by 8. The value of "ph_virtual_boundaries_pos_y[i]" is in the range of 1 to Ceil(pic_height_in_luma_samples÷8)−1, inclusive.

The location of the horizontal virtual boundary "VirtualBoundariesPosY[i]" in units of luma samples is derived as follows:
VirtualBoundariesPosY[i]=(sps_virtual_boundaries_present_flag?
sps_virtual_boundaries_pos_y[i]:ph_virtual_boundaries_pos_y[i])*8.

The distance between any two horizontal virtual boundaries may be greater than or equal to CtbSizeY luma samples.

Wrap-around motion compensation is another 360-degree video coding tool. In the conventional motion compensation, when a motion vector refers to samples beyond the picture boundaries of the reference picture, repetitive padding is applied to derive the values of the out-of-bounds samples by copying from those nearest neighbors on the corresponding picture boundary. For the 360-degree video, this method of repetitive padding is not suitable, and could cause visual artefacts called "seam artefacts" in a reconstructed viewport video. Because a 360-degree video is captured on a sphere and inherently has no "boundary," the reference samples that are out of the boundaries of a reference picture in the projected domain can always be obtained from neighboring samples in the spherical domain. For a general projection format, it may be difficult to derive the corresponding neighboring samples in the spherical domain, because it involves 2D-to-3D and 3D-to-2D coordinate conversion, as well as sample interpolation for fractional sample positions. This problem is much simpler for the left and right boundaries of the equirectangular projection (ERP) or padded ERP (PERP) format, as the spherical neighbors outside of the left picture boundary can be obtained from samples inside the right picture boundary, and vice versa. Given the wide usage of the ERP or PERP projection format and the relative ease of implementation, the horizontal wrap-around motion compensation can be used to improve the visual quality of 360-video coded in the ERP projection format.

Figure 7A:
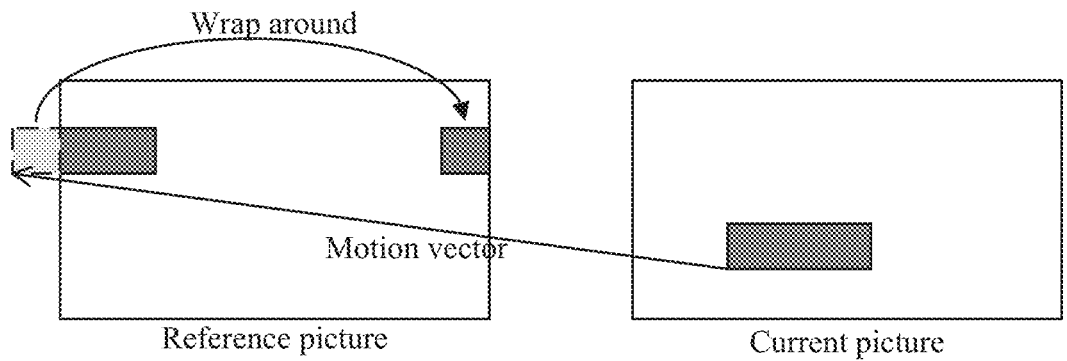
FIG. 7A illustrates exemplary Horizontal wrap-around motion compensation for equirectangular projection (ERP), consistent with some embodiments of the disclosure.
Figure 7B:
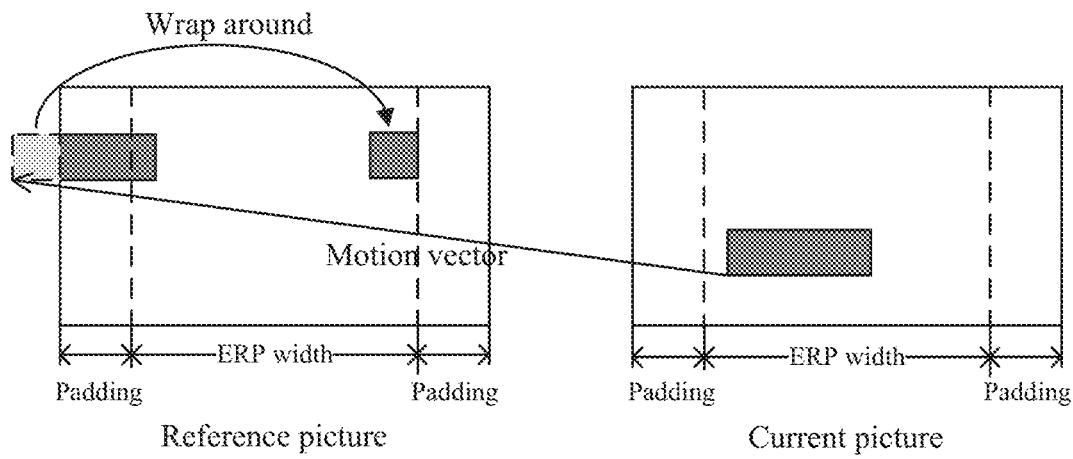
FIG. 7B illustrates exemplary Horizontal wraparound motion compensation for padded ERP (PERP), consistent with some embodiments of the disclosure.

The horizontal wrap-around motion compensation process is depicted in FIG. 7A. When a part of the reference block is outside of the reference picture's left (or right) boundary in the projected domain, instead of repetitive padding, the "out-of-boundary" part is taken from the corresponding spherical neighbors that are located within the reference picture toward the right (or left) boundary in the projected domain. Repetitive padding is only used for the top and bottom picture boundaries. As depicted in FIG. 7B, the horizontal wrap-around motion compensation can be combined with the non-normative padding method often used in 360-degree video coding. This can be achieved by signaling a high level syntax element to indicate the wrap-around offset, which should be set to the ERP picture width before padding. This syntax is used to adjust the position of horizontal wrap-around accordingly. This syntax is not affected by the specific amount of padding on the left and right picture boundaries, and therefore naturally supports asymmetric padding of the ERP picture (i.e., when left and right paddings are different). The horizontal wrap-around motion compensation provides more meaningful information for motion compensation when the reference samples are outside of the reference picture's left and right boundaries. This tool improves compression performance not only in terms of rate-distortion performance, but also in terms of reduced seam artefacts and improved subjective quality of the reconstructed 360-degree video. The horizontal wrap-around motion compensation can also be used for other single face projection formats with constant sampling density in the horizontal direction, such as adjusted equal-area projection.

According to some embodiments, wrap-around motion compensation is signaled in SPS. First, an enabling flag is signaled. If it is true, then wrap-around offset is signaled. The SPS syntax is shown in FIG. 8 and the corresponding semantics are given below.

"sps_ref_wraparound_enabled_flag" equal to 1 specifies that horizontal wrap-around motion compensation is applied in inter prediction. "sps_ref_wraparound_enabled_flag" equal to 0 specifies that horizontal wrap-around motion compensation is not applied. When the value of (CtbSizeY/MinCbSizeY+1) is larger than (pic_width_in_luma_samples/MinCbSizeY−1), where "pic_width_in_luma_samples" is the value of "pic_width_in_luma_samples" in any picture parameter set (PPS) that refers to the SPS, the value of "sps_ref_wraparound_enabled_flag" is equal to 0.

"sps_ref_wraparound_offset_minus1" plus 1 specifies the offset used for computing the horizontal wrap-around position in units of MinCbSizeY luma samples. The value of "ref_wraparound_offset_minus1" is in the range of (CtbSizeY/MinCbSizeY)+1 to (pic_width_in_luma_samples/MinCbSizeY)−1, inclusive, where "pic_width_in_luma_samples" is the value of "pic_width_in_luma_samples" in any PPS that refers to the SPS.

CtbSizeY is the luma size of coding tree block (CTB), MinCbSizeY is the min size of luma coding block, and "pic_width_in_luma_samples" is the picture width in luma samples.

According to some embodiments, the maximum values of width and height of all the pictures within a picture sequence is signaled in SPS and then in each PPS, the picture width and height are signaled for the current picture. The syntax for signaling maximum values of picture width and height is shown in Table 4 of FIG. 9 and the syntax for signaling the picture width and height is shown in Table 5 of FIG. 10. The semantics corresponding to FIGS. 9 and 10 are given below.

"ref_pic_resampling_enabled_flag" equal to 1 specifies that reference picture resampling may be applied when decoding coded pictures in the coded layer video sequences (CLVSs) referring to the SPS. ref_Pic_resampling_enabled_flag equal to 0 specifies that reference picture resampling is not applied when decoding pictures in CLVSs referring to the SPS. For example, a decoding program can decode each of the frames. If the decoding program determines a resolution of a current frame is different from the resolution of the reference picture, the decoding program can perform suitable resampling to the reference picture, and then use the generated resampling reference picture as the reference picture for the current frame. That is to say, when the picture spatial resolution is allowed to be changed within a video sequence, the resampling of the reference picture is needed. The suitable resampling of the reference picture can be a down sampling or an up sampling of the reference picture.

"pic_width_max_in_luma_samples" specifies the maximum width, in units of luma samples, of each decoded picture referring to the SPS. "pic_width_max_in_luma_samples" may not be equal to 0 and may be an integer multiple of Max(8, MinCbSizeY).

"pic_height_max_in_luma_samples" specifies the maximum height, in units of luma samples, of each decoded picture referring to the SPS. "pic_height_max_in_luma_samples" may not be equal to 0 and may be an integer multiple of Max(8, MinCbSizeY).

"pic_width_in_luma_samples" specifies the width of each decoded picture referring to the PPS in units of luma samples. "pic_width_in_luma_samples" may not be equal to 0. Rather, "pic_width_in_luma_samples" may be an integer multiple of Max(8, MinCbSizeY), and may be less than or equal to "pic_width_max_in_luma_samples."

When "subpics_present_flag" is equal to 1 or when "ref_pic_resampling_enabled_flag" is equal to 0, the value of "pic_width_in_luma_samples" is equal to "pic_width_max_in_luma_samples."

"pic_height_in_luma_samples" specifies the height of each decoded picture referring to the PPS in units of luma samples. "pic_height_in_luma_samples" may not be equal to 0. Rather, "pic_height_in_luma_samples" may be an integer multiple of Max(8, MinCbSizeY), and may be less than or equal to "pic_height_max_in_luma_samples."

When "subpics_present_flag" is equal to 1 or when "ref_pic_resampling_enabled_flag" is equal to 0, the value of "pic_height_in_luma_samples" is equal to "pic_height_max_in_luma_samples."

The above-described SPS signaling of virtual boundaries may cause some ambiguities. In particular, the range of "sps_virtual_boundaries_pos_x[i]" and "sps_virtual_boundaries_pos_y[i]," which are signaled in SPS, are from 0 to Ceil(pic_width_in_luma_samples÷8)−1 and from 0 to Ceil(pic_height_in_luma_samples÷8)−1, respectively. However, as described above, "pic_width_in_luma_samples" and "pic_height_in_luma_samples" are signaled in PPS and they may vary from one PPS to another PPS. It is not clear whether the "pic_width_in_luma_samples" and "pic_height_in_luma_samples" should be set as the upper bound for the "sps_virtual_boundaries_pos_x[i]" and "sps_virtual_boundaries_pos_y[i]," since there may be multiple PPS referring to the same SPS.

Moreover, the above-described SPS signaling of wrap-around motion compensation may have some problems. In particular, "sps_ref_wraparound_enabled_flag" and "sps_ref_wraparound_offset_minus1" are syntax elements signaled in SPS, but there is a conformance constraint of "sps_ref_wraparound_enabled_flag" dependent on the "pic_width_in_luma_samples" which is signaled on PPS. And the range of "sps_ref_wraparound_offset_minus1" is also dependent on "pic_width_in_luma_samples" which is signaled on PPS. These dependencies cause some problems. First, restricting the value of a SPS syntax element by the syntax elements in all of the associated PPS is not an efficient way because SPS is a higher level than PPS. Moreover, it is normally understood that high level syntax should not refer to low level syntax. Second, according to the current design, "sps_ref_wraparound_enabled_flag" can only be true when the widths of all the pictures in the sequence referring the SPS satisfy the constraint condition. Therefore, wrap-around motion compensation cannot be used even if only one frame in the whole sequence fails to meet the constraint condition. Thus, the benefit of wrap-around motion compensation for the whole sequence is lost just because of one frame.

The present disclosure provides methods to solve the above problems associated with signaling virtual boundaries or wrap-around motion compensation. Some exemplary embodiments consistent with the disclosed methods are described below in detail.

In some exemplary embodiments, to solve the above problems associated with the signaling of virtual boundaries, the upper bounds of the values of "sps_virtual_boundaries_pos_x[i]" and "sps_virtual_boundaries_pos_y[i]" are changed to the minimum values of width and height of the picture in the sequence. Therefore, for each picture, the virtual boundary position signaled in SPS ("sps_virtual_boundaries_pos_x[i]" and "sps_virtual_boundaries_pos_y[i]") is not beyond the picture boundary.

The semantics consistent with these embodiments are described below.

"sps_virtual_boundaries_pos_x[i]" specifies the location of the i-th vertical virtual boundary in units of luma samples divided by 8. The value of "sps_virtual_boundaries_pos_x[i]" is in the range of 1 to Ceil(pic_width_in_luma_samples÷8)−1, inclusive, where "pic_width_in_luma_samples" is the value of "pic_width_in_luma_samples" in any PPS that refers to the SPS.

"sps_virtual_boundaries_pos_y[i]" specifies the location of the i-th horizontal virtual boundary in units of luma samples divided by 8. The value of "sps_virtual_boundaries_pos_y[i]" is in the range of 1 to Ceil(pic_height_in_luma_samples÷8)−1, inclusive, where "pic_height_in_luma_samples" is the value of "pic_width_in_luma_samples" in any PPS that refers to the SPS.

In some exemplary embodiments, to solve the above problems associated with the signaling of virtual boundaries, the upper bounds of the values of "sps_virtual_boundaries_pos_x[i]" and "sps_virtual_boundaries_pos_y[i]" are changed to "pic_width_max_in_luma_samples" and "pic_height_max_in_luma_samples" respectively, which are the maximum values of width and height of the picture in the sequence, respectively. And for each picture, if the virtual boundary position signaled in SPS ("sps_virtual_boundaries_pos_x[i]" and "sps_virtual_boundaries_pos_y[i]") is beyond the picture boundary, the virtual boundary is clipped within the boundary or discarded.

The semantics consistent with these embodiments are described below.

"sps_virtual_boundaries_pos_x[i]" specifies the location of the i-th vertical virtual boundary in units of luma samples divided by 8. The value of "sps_virtual_boundaries_pos_x[i]" is in the range of 1 to Ceil(pic_width_max_in_luma_samples÷8)−1, inclusive.

"sps_virtual_boundaries_pos_y[i]" specifies the location of the i-th horizontal virtual boundary in units of luma samples divided by 8. The value of "sps_virtual_boundaries_pos_y[i]" is in the range of 1 to Ceil(pic_height_max_in_luma_samples÷8)−1, inclusive.

As an example, for each picture, the virtual boundary position signaled in SPS is clipped within the current picture boundary. In this example, the derived virtual boundary position VirtualBoundariesPosX[i] and VirtualBoundariesPosY[i], and the number of virtual boundaries VirtualBoundariesNumVer and VirtualBoundariesNumHor are derived as follows.

VirtualBoundariesNumVer=sps_virtual_boundaries_present_flag?
        sps_num_ver_virtual_boundaries:ph_num_ver_virtual_boundaries
    VirtualBoundariesPosX[i](sps_virtual_boundaries_present_flag?
        min(Ceil(pic_width_in_luma_samples÷8)−1,sps_virtual_boundaries_pos_[i]):ph_virtual_boundaries_pos_x[i])*8
    VirtualBoundariesNumHor=sps_virtual_boundaries_present_flag?
        sps_num_hor_virtual_boundaries:ph_num_hor_virtual_boundaries
    VirtualBoundariesPosY[i](sps_virtual_boundaries_present_flag?
        min(Ceil(pic_width_in_luma_samples÷8)−1,sps_virtual_boundaries_pos_y[i]):ph_virtual_boundaries_pos_y[i])*8

The distance between any two vertical virtual boundaries may be zero, or greater than or equal to CtbSizeY luma samples.

The distance between any two horizontal virtual boundaries may be zero, or greater than or equal to CtbSizeY luma samples.

As another example, for each picture, if a virtual boundary position signaled in SPS is beyond the current picture boundary, the virtual boundary is not used in current picture. The derived virtual boundary position VirtualBoundariesPosX[i] and VirtualBoundariesPosY[i], and the number of virtual boundaries VirtualBoundariesNumVer and VirtualBoundariesNumHor are derived as follows.

```
VirtualBoundariesNumVer = sps_virtual_boundaries_present_flag ?
    sps_num_ver_virtual_boundaries : ph_num_ver_virtual_boundaries
VirtualBoundariesPosXInPic[ i ] = ( sps_virtual_boundaries_present_flag ?
    sps_virtual_boundaries_pos_x[ i ] : ph_virtual_boundaries_pos_x[ i ] ) * 8, (i=0..
VirtualBoundariesNumVer)
VirtualBoundariesNumHor = sps_virtual_boundaries_present_flag ?
    sps_num_hor_virtual_boundaries : ph_num_hor_virtual_boundaries
VirtualBoundariesPosYInPic[ i ] = (sps_virtual_boundaries_present_flag ?
    sps_virtual_boundaries_pos_y[ i ] : ph_virtual_boundaries_pos_y[ i ] ) * 8, (i=0..
VirtualBoundariesNumHor)
for(i=0,j=0;i< VirtualBoundariesNumVer;i++){
    if(VirtualBoundariesPosXInPic[ i ] <= Ceil( pic_width_in_luma_samples ÷ 8 ) − 1){
        VirtualBoundariesPosX[j++]= VirtualBoundariesPosXInPic[ i ]
    }
}
VirtualBoundariesNumVer=j
for(i=0,j=0;i< VirtualBoundariesNumHor;i++){
    if(VirtualBoundariesPosYInPic[ i ] <= Ceil( pic_height_in_luma_samples ÷ 8 ) − 1){
        VirtualBoundariesPosY[j++]= VirtualBoundariesPosYInPic[ i ]
    }
}
VirtualBoundariesNumHor=j
```

Alternatively, the derived virtual boundary position "VirtualBoundariesPosX[i]," "VirtualBoundariesPosY[i]," and the number of virtual boundaries VirtualBoundariesNumVer and VirtualBoundariesNumHor are derived as follows.

for (i=0,j=0;i<sps_num_ver_virtual_boundaries;i++){
        if        (sps_virtual_boundaries_pos_x[i]<=Ceil(pic_width_in_luma_samples÷8)−1){VirtualBoundariesPosX[j++]=sps_virtual_boundaries_pos_x[i]
        }
    }
    VirtualBoundariesNutuVer=j
    for (i=0,j=0;i<sps_num_hor_virtual_boundaries;i++){
        if        (sps_virtual_boundaries_pos_y[i]<=Ceil(pic_height_in_luma_samples÷8)−1){VirtualBoundariesPosY[j++]=sps_virtual_boundaries_pos_y[i]
        }
    }
    VirtualBoundariesNumHor=j
    VirtualBoundariesNumVer=sps_virtual_boundaries_present_flag?
        VirtualBoundariesNurnVer:ph_num_ver_virtual_boundaries
    VirtualBoundariesPosX[i]=(sps_virtual_boundaries_present_flag_?

VirtualBoundariesPosX[i]:ph_virtual_boundaries_pos_x[i])*8, (i=0 . . . VirtualBoundariesNumVer)
VirtualBoundariesNumHor=sps_virtual_boundaries_present_flag?
VirtualBoundariesNumHor:ph_num_hor_virtual_boundaries
VirtualBoundariesPosY[i]=(sps_virtual_boundaries_present_flag?
VirtualBoundariesPosY[i]:ph_virtual_boundaries_pos_y[i])*8, (i=0 . . . VirtualBoundariesNumHor)

In some exemplary embodiments, to solve the above problems associated with the signaling of virtual boundaries, the upper bounds of the values of "sps_virtual_boundaries_pos_x[i]" and "sps_virtual_boundaries_pos_y[i]" are changed to "pic_width_max_in_luma_samples" and "pic_height_max_in_luma_samples" respectively, which are the maximum values of width and height of the picture in the sequence, respectively. And for each picture, if the virtual boundary position signaled in SPS ("sps_virtual_boundaries_pos_x[i]" and "sps_virtual_boundaries_pos_y[i]") is scaled according to the ratio between maximum picture width and height signaled in SPS and the current picture width and height signaled in PPS.

The semantics consistent with these embodiments are described as below.

"sps_virtual_boundaries_pos_x[i]" specifies the location of the i-th vertical virtual boundary in units of luma samples divided by 8. The value of "sps_virtual_boundaries_pos_x[i]" is in the range of 1 to Ceil(pic_width_max_in_luma_samples÷8)−1, inclusive.

"sps_virtual_boundaries_pos_y[i]" specifies the location of the i-th horizontal virtual boundary in units of luma samples divided by 8. The value of "sps_virtual_boundaries_pos_y[i]" is in the range of 1 to Ceil(pic_height_max_in_luma_samples÷8)−1, inclusive.

To derive the virtual boundary position for each picture, the scaling ratio is calculated first and then the virtual boundary position signaled in SPS is scaled as follows.

$$VBScaleX = ((pic\_width\_max\_in\_luma\_samples \ll 14) + (pic\_width\_in\_luma\_samples \gg 1))/pic\_width\_in\_luma\_samples$$

$$VBScaleY = ((pic\_height\_max\_in\_luma\_samples \ll 14) + (pic\_height\_in\_luma\_samples \gg 1))/pic\_height\_in\_luma\_samples$$

$$SPSVirtualBoundariesPosX[i] = (sps\_virtual\_boundaries\_pos\_x[i] \times VBScaleX + (1 \ll 13)) \gg 14$$

$$SPSVirtualBoundariesPosY[i] = (sps\_virtual\_boundaries\_pos\_y[i] \times VBScaleY + (1 \ll 13)) \gg 14$$

For example, "SPSVirtualBoundariesPosX[i]" and "SPSVirtualBoundariesPosY[i]" may be further rounded to 8-pixel grid as follows.

$$STSVirtualBoundariesPosX[i] = ((SPSVirtualBoundariesPosX[i] + 4) \gg 3) \ll 3$$

$$SPSVirtualBoundariesPosY[i] = ((SPSVirtualBoundariesPosY[i] + 4) \gg 3) \ll 3$$

Finally, the derived virtual boundary position "VirtualBoundariesPosX[i]" and "VirtualBoundariesPosY[i]," and the number of virtual boundaries "VirtualBoundariesNumVer" and "VirtualBoundariesNumHor" are derived as follows.
VirtualBoundariesNumVer=sps_virtual_boundaries_present_flag? sps_num_ver_virtual_boundaries: ph_num_ver_virtual_boundaries VirtualBoundariesPosX[i]=(sps_virtual_boundaries_present_flag? SPSVirtualBoundariesPosX[i]:ph_virtual_boundaries_pos_x[i])*8, (i=0 . . . VirtualBoundariesNumVer)
VirtualBoundariesNumHor=sps_virtual_boundaries_present_flag? sps_num_hor_virtual_boundaries: ph_num_hor_virtual_boundaries
VirtualBoundariesPosY[i](sps_virtual_boundaries_present_flag? SPSVirtualBoundariesPosY[i]:ph_virtual_boundaries_pos_y[i])*8, (i=0 . . . VirtualBoundariesNumHor)

In some exemplary embodiments, to solve the above problems associated with the signaling of virtual boundaries, sequence level virtual boundary signaling and picture width and height changes are used in a mutually exclusive manner. For example, when the virtual boundary is signaled in SPS, the picture width and height cannot be changed in the sequence. When the picture width and height is changed in the sequence, the virtual boundary cannot be signaled in SPS.

In the present embodiments, the upper bound of the values of "sps_virtual_boundaries_pos_x[i]" and "sps_virtual_boundaries_pos_y[i]" are changed to "pic_width_max_in_luma_samples" and "pic_width_max_in_luma_samples" respectively, which are the maximum values of width and height of the picture in the sequence, respectively.

The semantics of "sps_virtual_boundaries_pos_x[i]" and "sps_virtual_boundaries_pos_y[i]" consistent with the present embodiments are as follows.

"sps_virtual_boundaries_pos_x[i]" specifies the location of the i-th vertical virtual boundary in units of luma samples divided by 8. The value of "sps_virtual_boundaries_pos_x[i]" is in the range of 1 to Ceil(pic_width_max_in_luma_samples÷8)−1, inclusive.

"sps_virtual_boundaries_pos_y[i]" specifies the location of the i-th horizontal virtual boundary in units of luma samples divided by 8. The value of "sps_virtual_boundaries_pos_y[i]" is in the range of 1 to Ceil(pic_height_max_in_luma_samples÷8)−1, inclusive.

As an example, a bitstream conformance requirement of "pic_width_in_luma_samples" and "pic_height_in_luma_samples" may be imposed as follows.

When (1) "subpics_present_flag" is equal to 1, or (2) "ref_pic_resampling_enabled_flag" is equal to 0, or (3) "sps_virtual_boundaries_present_flag" is equal to 1, then the value of "pic_width_in_luma_samples" is equal to "pic_width_max_in_luma_samples." According to the third condition of this constraint (i.e., "sps_virtual_boundaries_present_flag" is equal to 1), when the virtual boundary is present in SPS, each picture in a sequence has the same width that is equal to the maximum width of the pictures in the sequence.

When (1) "subpics_present_flag" is equal to 1, or (2) "ref_pic_resampling_enabled_flag" is equal to 0, or (3) "sps_virtual_boundaries_present_flag" is equal to 1, then the value of "pic_height_in_luma_samples" is equal to "pic_height_max_in_luma_samples." According to the third condition of this constraint (i.e., "sps_virtual_boundaries_present_flag" is equal to 1), when the virtual boundary is present in SPS, each picture in a sequence has the same height that is equal to the maximum height of the picture in the sequence.

As another example, a bitstream conformance requirement of "pic_width_in_luma_samples" and "pic_height_in_luma_samples" may be imposed as follows.

When (1) "subpics_present_flag" is equal to 1, or (2) "ref_pic_resampling_enabled_flag" is equal to 0, or (3) "sps_num_ver_virtual_boundaries" is not equal to 0, then the value of "pic_width_in_luma_samples" is equal to "pic_width_max_in_luma_samples." According to the third condition of this constraint (i.e., "sps_num_ver_virtual_boundaries" is not equal to 0), if a number of the vertical virtual boundary is larger than 0 (i.e., there is at least one vertical virtual boundary), each picture in a sequence has the same width that is equal to the maximum width of the picture in the sequence.

When (1) "subpics_present_flag" is equal to 1, or (2) "ref_pic_resampling_enabled_flag" is equal to 0, or (3) "sps_num_hor_virtual_boundaries" is not equal to 0, then the value of "pic_height_in_luma_samples" is equal to "pic_height_max_in_luma_samples." According to the third condition of this constraint (i.e., "sps_num_hor_virtual_boundaries" is not equal to 0), if a number of the vertical virtual boundary is larger than 0 (i.e., there is at least one vertical virtual boundary), each picture in a sequence has the same width that is equal to the maximum width of the picture in the sequence.

As another example, a bitstream conformance requirement of "sps_virtual_boundaries_present_flag" may be imposed as follows: It is a requirement of bitstream conformance that when "ref_pic_resampling_enabled_flag" is 1, "sps_virtual_boundaries_present_flag" is 0. According this constraint, if reference picture resampling is enabled, a virtual boundary should not be present in SPS. The philosophy of this constraint is as follows. Reference picture resampling is used when the current picture has a different resolution from the reference picture. When the picture resolution is allowed to be changed within a sequence, the position of the virtual boundary can also be changed from picture to picture as different pictures may have different resolutions. Thus, virtual boundary position can be signalled at a picture level (e.g., PPS). The sequence level signalling of virtual boundary (i.e., signalled in SPS) is not suitable.

As another example, "sps_virtual_boundaries_present_flag" is conditionally signaled on "ref_pic_resampling_enabled_flag." For example, "ref_pic_resampling_enabled_flag" equal to 0 specifies that reference picture resampling is not applied when decoding pictures in CLVSs referring to the SPS and "sps_virtual_boundaries_present_flag" is signaled based on the value of "!ref_pic_resampling_enabled_flag" being 1. The syntax is shown in FIG. 11, with the changes to the syntax in Table FIG. 5) being shown in italics. The associated semantics are described as follows.

"sps_virtual_boundaries_present_flag" equal to 1 specifies that information of virtual boundaries is signalled in the SPS. "sps_virtual_boundaries_present_flag" equal to 0 specifies that information of virtual boundaries is not signalled in the SPS. When there are one or more virtual boundaries signalled in the SPS, the in-loop filtering operations are disabled across the virtual boundaries in pictures referring to the SPS. When "sps_virtual_boundaries_present_flag" is not present, its value is inferred to be 0. In-loop filtering operations include the deblocking filter, sample adaptive offset filter, and adaptive loop filter operations.

As another example, "ref_pic_resampling_enabled_flag" is conditionally signaled on "sps_virtual_boundaries_present_flag." The syntax is shown in FIG. 12, with the changes to the syntax in Table 1 (FIG. 5) are shown with italics and strikethrough. The associated semantics are described below.

"ref_pic_resampling_enabled_flag" equal to 1 specifies that reference picture resampling may be applied when decoding coded pictures in the CLVSs referring to the SPS, "ref_pic_resampling_enabled_flag" equal to 0 specifies that reference picture resampling is not applied when decoding pictures in CLVSs referring to the SPS.
When "ref_pic_resampling__enabled_flag" is not present, its value is inferred to be 0.

Further, to solve the above problems associated with the signaling of wrap-around motion compensation "sps_ref_wraparound_enabled_flag" can only be true when the widths of all the pictures in the sequence referring the SPS satisfy the constraint condition, the following embodiments are provided by the present disclosure.

In some embodiments, the constraint on the wrap-around motion compensation enabling flag and wrap-around offset is changed to depend on the maximum picture width, which is signaled in SPS. And at a picture level, the check of picture width is introduced. The wrap-around can only be applied to the picture with a width satisfying the condition. For those pictures of which the width fails to meet condition, the wrap-around is turned off even if "sps_ref_wraparound_enabled_flag" is true. By doing this, there is no need to restrict "sps_ref_wraparound_enabled_flag" and "sps_ref_wraparound_offset_minus1" signaled in SPS using picture width which is signaled in PPS. The syntax is not changed and the semantics of "sps_ref_wraparound_enabled_flag" and "sps_ref_wraparound_offset_minus1" are as follows.

"sps_ref_wraparound_enabled_flag" equal to 1 specifies that horizontal wrap-around motion compensation may be applied in inter prediction. sps_ref_wraparound_enabled_flag equal to 0 specifies that horizontal wrap-around motion compensation is not applied. When the value of (CtbSizeY/MinCbSizeY+1) is larger than (pic_width_max_in_luma_samples/_MinCbSizeY−1), the value of sps_ref_wraparound_enabled_flag shall be equal to 0.

"sps_ref_wraparound_offset_minus1" plus 1 specifies the maximum value of offset used for computing the horizontal wrap-around position in units of MinCbSizeY luma samples. The value of sps_ref_wraparound_offset_minus1 shall be in the range of (CtbSizeY/MinCbSizeY)+1 to (pic_width_max_in_luma_samples/MinCbSize:Y)−1, inclusive.

Wherein pic_width_max_in_luma_samples is the maximum width, in units of luma samples, of each decoded picture referring to the SPS as VVC draft 7. CtbSizeY and MinCbSizeY are as defined as VVC draft 7.

For each picture of the sequence, a variable "PicRefWraparoundEnableFlag" is defined as follows.

PicRefWraparoundEnableFlag=sps_ref_wraparound_enabled_flag && sps_ref_wraparound_offset_minus1<= (pic_width_in_luma_samples/MinCbSizeY−1))

Wherein "pic_width_in_luma_samples" is the width of the picture referring to the PPS in which "pic_width_in_luma_samples" is signaled as VVC draft 7. CtbSizeY and MinCbSizeY are as defined as VVC draft 7.

The variable "PicRefWraparoundEnableFlag" is used to determine whether wrap-around MC can be enabled for the current picture.

In an alternative way, for each picture of the sequence, two variables "PicRefWraparoundEnableFlag" and "PicRefWraparoundOffset" are defined as follows.

PicRefWraparoundEnableFlag=sps_ref_wraparound_enabled_flag && ((ctbSizeY/MinCbSizeY+1)<= (pic_width_in_luma_samples/MinCbSizeY−1))

PicRefWraparoundOffset=min(sps_ref_wraparound_offset_minus+1, (pic_width_in_luma_samples/MinCbSizeY))

Wherein "pic_width_in_luma_samples" is the width of the picture referring to the PPS in which "pic_width_in_luma_samples" is signaled as VVC draft 7. CtbSizeY and MinCbSizeY are as defined as VVC draft 7.

The variable "PicRefWraparoundEnableFlag" is used to determine whether wrap-around MC can be enabled for the current picture. And if so, the offset "PicRefWraparoundOffset" can be used in motion compensation process.

In some embodiments, mutually exclusive use of wrap-around motion compensation and sequence level virtual boundary signaling and picture width change are provided. When wrap-around motion compensation is enabled, the picture width cannot be changed in the sequence. When the picture width is changed in the sequence, the wrap-around motion compensation is disabled.

As an example, the semantics of "sps_ref_wraparound_enabled_flag" and "sps_ref_wraparound_offset_minus1" consistent with the present embodiments are described as follows.

"sps_ref_wraparound_enabled_flag" equal to 1 specifies that horizontal wrap-around motion compensation is applied in inter prediction. "sps_ref_wraparound_enabled_flag" equal to 0 specifies that horizontal wrap-around motion compensation is not applied. When the value of (CtbSizeY/MinCbSizeY+1) is larger than (pic_width_max_in_luma_samples/MinCbSizeY−1), the value of sps_ref_wraparound_enabled_flag may be equal to 0.

"sps_ref_wraparound_offset_minus1" plus 1 specifies the offset used for computing the horizontal wrap-around position in units of MinCbSizeY luma samples. The value of "ref_wraparound_offset_minus1" may be in the range of (CtbSizeY/MinCbSizeY)+1 to (pic_width_max_in_luma_samples/MinCbSizeY)−1, inclusive.

A bitstream conformance requirement of "pic_width_in_luma_samples" and "pic_height_in_luma_samples" may be imposed as follows.

When "subpics_present_flag" is equal to 1 or "ref_pic_resampling_enabled_flag" equal to 0 or "sps_ref_wraparound_enabled_flag" is equal to 1, the value of "pic_width_in_luma_samples" is equal to "pic_width_max_in_luma_samples."

As another example, a bitstream conformance requirement of "sps_ref_wraparound_enabled_flag" may be imposed. The semantics of "sps_ref_wraparound_enabled_flag" and "sps_ref_wraparound_offset_minus1" consistent with the present embodiments are described as follows.

"sps_ref_wraparound_enabled_flag" equal to 1 specifies that horizontal wrap-around motion compensation is applied in inter prediction. "sps_ref_wraparound_enabled_flag" equal to 0 specifies that horizontal wrap-around motion compensation is not applied. When the value of (CtbSizeY/MinCbSizeY+1) is larger than (pic_width_max_in_luma_samples/MinCbSizeY−1), the value of sps_ref_wraparound_enabled_flag is equal to 0.

When ref_pic_resampling_enabled_flag is 1, the value of "sps_ref_wraparound_enabled_flag" may be 0. ref_pic_resampling_enabled_flag specifies whether reference resampling is enabled. The reference resampling is used to resample the reference picture when the resolution of reference picture is different from the resolution of the current picture. So at a picture level (e.g., PPS, PH), when the resolution of the reference picture is difference from the current picture, the wraparound motion compensation is not used to predict the current picture.

"sps_ref_wraparound_offset_minus1" plus 1 specifies the offset used for computing the horizontal wrap-around position in units of MinCbSizeY luma samples. The value of "ref_wraparound_offset_minus1" is in the range of (CtbSizeY/MinCbSizeY)+1 to (pic_width_max_in_luma_samples/MinCbSizeY)−1, inclusive.

As another example, "sps_ref_wraparoud_enabled_flag" is conditionally signaled on "ref_pic_resampling_enabled_flag" The syntax is shown in FIG. 13, with the changes to the syntax in Table 3 (FIG. 8) being shown in italics. The associated semantics are described below.

"sps_ref_wraparound_enabled_flag" equal to 1 specifies that horizontal wrap-around motion compensation is applied in inter prediction. "sps_ref_wraparound_enabled_flag" equal to 0 specifies that horizontal wrap-around motion compensation is not applied. When the value of (CtbSizeY/MinCbSizeY+1) is larger than (pic_width_max_in_luma_samples/MinCbSizeY−1), the value of "sps_ref_wraparound_enabled_flag" is equal to 0. When "sps_ref_wraparound_enabled_flag" is not present, its value is inferred to be 0.

"sps_ref_wraparound_offset_minus1" plus 1 specifies the offset used for computing the horizontal wrap-around position in units of MinCbSizeY luma samples. The value of ref_wraparound_offset_minus1 is in the range of (CtbSizeY/MinCbSizeY)+1 to (pic_width_max_in_luma_samples/MinCbSizeY)−1, inclusive.

As an example, "ref_pic_resampling_enabled_flag" is conditionally signaled on "sps_ref_wraparound_enabled_flag." The syntax is shown as Table 9 of FIG. 14, with the changes to the syntax in Table 3 (FIG. 8) being shown in italics and strikethrough. The associated semantics are as follows.

"ref_pic_resampling_enabled_flag" equal to 1 specifies that reference picture resampling may be applied when decoding coded pictures in the CLVSs referring to the SPS. ref_pic_resampling_enabled_flag equal to 0 specifies that reference picture resampling is not applied when decoding pictures in CLVSs referring to the SPS. When ref_pic_resampling_enabled_flag is not present, its value is inferred to be 0.

Figure 15:
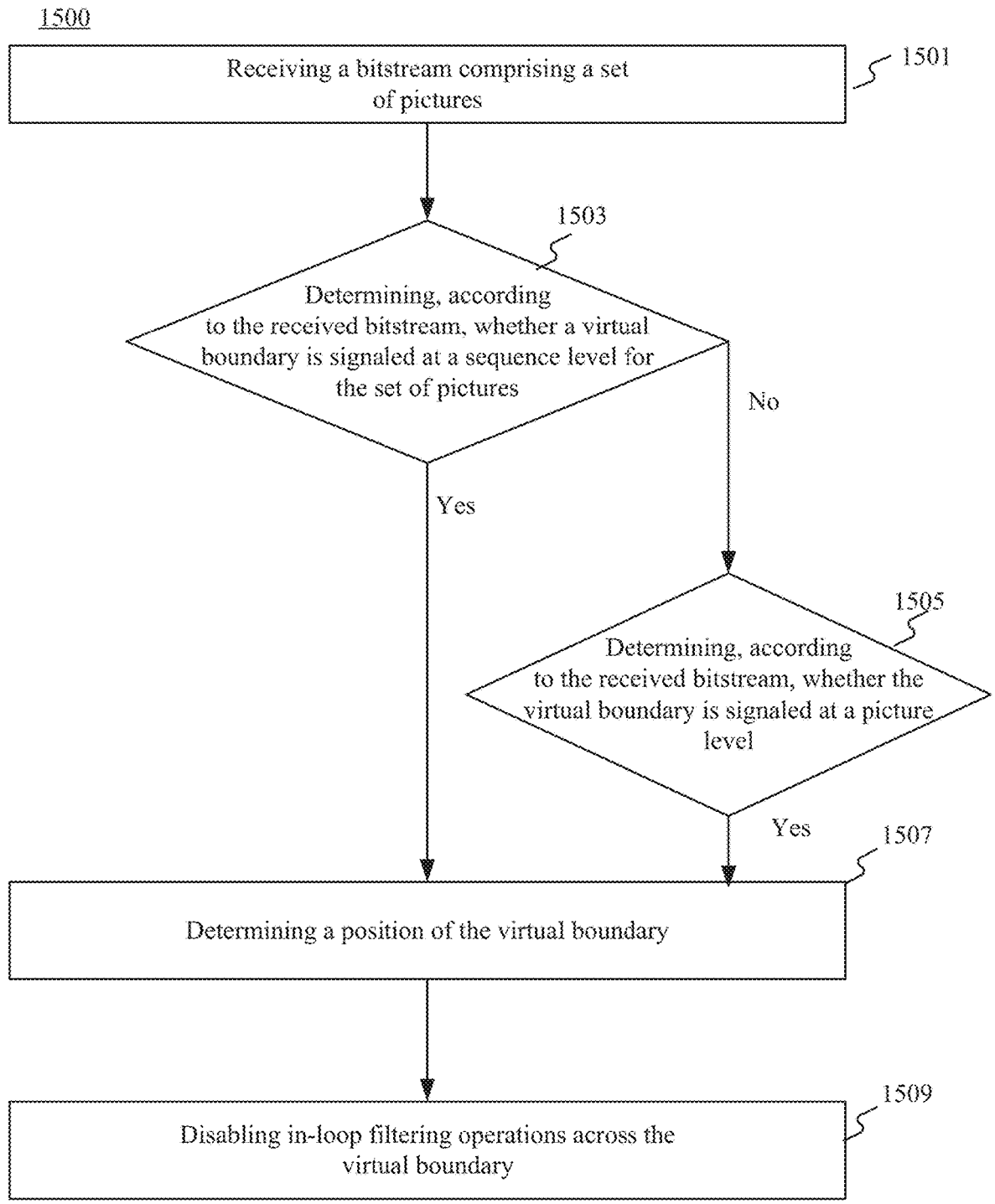
FIG. 15 illustrates an exemplary method for picture processing, consistent with some embodiments of the disclosure.

FIG. 15 illustrates a flowchart of an exemplary method 1500, consistent with some embodiments of the disclosure. In some embodiments, method 1500 can be performed by an encoder, one or more software or hardware components of an apparatus (e.g., apparatus 400 of FIG. 4). For example, a processor (e.g., processor 402 of FIG. 4) can perform method 1500. In some embodiments, method 1500 can be implemented by a computer program product, embodied in a computer-readable medium, including computer-executable instructions, such as program code, executed by computers (e.g., apparatus 400 of FIG. 4).

A virtual boundary can be set as one of the coding tools for 360-degree video or gradual decoding refresh (GDR) coding such that in-loop filtering can be disabled to prevent from error and artifacts. It is illustrated in the method shown in FIG. 15.

In step 1501, a bitstream comprising a sequence of pictures is received. The sequence of pictures can be a set of pictures. As described, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

In step 1503, whether the virtual boundary is signaled at a sequence level (i.e., in SPS) is determined according to the received stream. When the virtual boundary is signaled at the sequence level, a number of virtual boundaries and the position of each virtual boundary are signaled for pictures referring to the SPS.

The virtual boundary can be signaled in a sequence parameter set (SPS) or a picture header (PH). In SPS, a virtual boundary present flag "sps_virtual_boundaries_present_flag" is signaled first. If the flag is true, then a number of virtual boundaries and the position of each virtual boundary are signaled for pictures referring to the SPS.

In step 1505, optionally, in response to the virtual boundary is not signaled at the sequence level for the set of pictures, whether the virtual boundary is signaled at a picture level (e.g., PPS or PH) for a picture of the set of pictures is determined according to the received stream. For example, if "sps_virtual_boundaries_present_flag" is false, then in PH, another virtual boundary present flag "ph_virtual_boundaries_present_flag" can be signaled. Similarly, if "ph_virtual_boundaries_present_flag" is true, the number of virtual boundaries and the position of each virtual boundary can be signaled for the picture associated with the PH. Step 1505 is optional, in some embodiments, the method can include step 1505 in response to the virtual boundary not being signaled at the sequence level. In some embodiments, in response to the virtual boundary not being signaled at the sequence level, the method can end without performing step 1505. In response to the virtual boundary being signaled at the picture level, the method proceeds to step 1507 for determining a position of the virtual boundary.

In some embodiments, whether any condition indicating the virtual boundary being not signaled at the sequence level is met can be determined. As noted above in the example, the value of "sps_virtual_boundaries_present flag" in Table 1 of FIG. 5 can be determined and the value being 1 indicates the virtual boundary is signaled at the sequence level. However, there are other conditions indicating that the virtual boundary is not applied at the sequence level. A first condition that indicates no sequence level virtual boundary signaling is reference resampling being enabled. A second condition is that a resolution of a picture in the set of pictures is allowed to be changed. Any of these two conditions is met, the virtual boundary is not signaled at the sequence level. When none of these two conditions is met, and as in the example, the value of "sps_virtual_boundaries_present_flag" is determined to be 1, it is determined that the virtual signal is signaled at the sequence level for the set of pictures. The method proceeds to step 1507 for determining the position of the virtual boundary.

In some embodiments, whether reference resampling is enabled for the sequence of pictures is determined according to the received bitstream. In response to the reference resampling being enabled for the sequence of pictures, the virtual boundary is not signaled at the sequence level.

A decoding program can decode each of the frames. If the decoding program determines a resolution of a current frame is different from the resolution of the reference picture, the decoding program can perform suitable resampling to the reference picture, and then use the generated resampled reference block as the reference blocks to decode the blocks in the current frame. When the picture spatial resolution is allowed to be changed within a video sequence, the resampling of the reference picture is needed. When the resampling is enabled, the resolution can be allowed to be changed or not allowed to be changed. When the resolution of the picture is allowed to be changed, the resampling is enabled because the resampling is needed. The suitable resampling of the reference picture can be a down sampling or an up sampling of the reference picture. For example, as shown in in FIG. 9, "ref_pic_resampling_enabled_flag" equal to 1 specifies that reference picture resampling may be applied when decoding coded pictures in the CLVSs referring to the SPS. ref_pic_resampling_enabled_flag equal to 0 specifies that reference picture resampling is not applied when decoding pictures in CLVSs referring tee the SPS.

For example, "sps_virtual_boundaries_present_flag" in Table 1 of FIG. 5 can be conditionally signaled on "ref_pic_resampling_enabled_flag." The value of "ref_pic_resampling_enabled_flag" can be determined. "ref_pic_resampling_enabled_flag" equal to 0 specifies that reference picture resampling is not applied when decoding pictures in CLVSs referring to the SPS. When "ref_pic_resampling_enabled_flag" is 1, "sps_virtual_boundaries_present_flag" is 0.

In some embodiments, whether a resolution of a picture in the sequence of pictures is allowed to be changed is determined. In response to the resolution being allowed to be changed, it is determined that the virtual boundary is not signaled at the sequence level.

The reference picture resampling is used when the current picture has a different resolution from the reference picture. When the picture resolution is allowed to be changed within a sequence, the position of the virtual boundary can also be changed from picture to picture as different pictures may have different resolutions. Thus, virtual boundary position can be signalled at a picture level (e.g., PPS and PH), while the sequence level signalling of virtual boundary (i.e., signalled in SPS) is not suitable. Therefore, when the picture resolution is allowed to be changed, it is determined that the virtual boundary is not signaled at the sequence level. If, at the same time, the resampling is enabled but the picture resolution is not allowed to be changed, no constraint is placed on the virtual boundary signaling.

In some embodiments, in response to the reference resampling being enabled for the sequence of pictures, it is determined that wrap-around motion compensation is disabled for the sequence of pictures.

For example, it is determined that the value of "ref_pic_resampling_enabled_flag" in FIG. 13 is 1, "sps_ref_wraparound_enabled_flag" is 0 and horizontal wrap-around motion compensation is not applied. "ref_pic_resampling_enabled_flag" specifies whether reference resampling is enabled. The reference resampling is used to resample the reference picture when the resolution of reference picture is different from the resolution of the current picture. At a picture level (e.g., PPS), in this example, when the resolution of the reference picture is difference from the current picture, the wraparound motion compensation is not used to predict the current picture. If it is determined that the value of "ref_pic_resampling_enabled_flag" is 0, "sps_ref_wraparound_enabled_flag" is 1 and horizontal wrap-around motion compensation is applied.

In some embodiments, in response to the resolution of the picture in the sequence of pictures being allowed to be changed, it is determined that wrap-around motion compensation is disabled for the sequence of pictures.

In step 1507, in response to the virtual boundary being signaled at the sequence level, a position of the virtual boundary for the sequence is determined. The position is bounded by a range based on the widths and the heights of the pictures in the sequence. The virtual boundary can include vertical boundaries and horizontal boundaries. The position of a virtual boundary can include location points of vertical boundaries and location points of horizontal boundaries. For example, as shown in Table 1 of FIG. 5, "sps_virtual_boundaries_pos_x[i]" specifies the location of the i-th vertical virtual boundary in units of luma samples divided by 8, while "sps_virtual_boundaries_pos_y[i]" specifies the location of the i-th horizontal virtual boundary in units of luma samples divided by 8.

In some embodiments, a vertical range of the position is less than or equal to a maximum width allowed for each picture of the pictures in the sequence and a horizontal range is less than or equal to a maximum height allowed for each of the pictures in the set. The maximum width and the maximum height are signaled in the received stream. The examples in the semantics are as follows.

"sps_virtual_boundaries_pos_x[i]" specifies the location of the i-th vertical virtual boundary in units of luma samples divided by 8. The value of "sps_virtual_boundaries_pos_x [i]" is in the range of 1 to Ceil(pic_width_max_in_luma_samples÷8)−1, inclusive.

"sps_virtual_boundaries_pos_y[i]" specifies the location of the i-th horizontal virtual boundary in units of luma samples divided by 8. The value of "sps_virtual_boundaries_pos_y[i]" is in the range of 1 to Ceil(pic_height_max_in_luma_samples÷8)−1, inclusive.

When the virtual boundary is present in SPS, i.e., "sps_virtual_boundaries_present_flag" is equal to 1. each picture in the sequence has the same width that is equal to the maximum width of the pictures in the sequence.

In some embodiments, in response to the virtual boundary being signaled at the picture level for one picture of the set of pictures, the position of the virtual boundary for the one picture can be determined. One or more boundaries can be signaled for one or more pictures in the set. For example, as shown in the semantics of PH syntax in FIG. 6, "ph_num_ver_virtual_boundaries" specifies a number of "ph_virtual_boundaries_pos_x[i]" syntax elements that are present in the PH. When "ph_num_ver_virtual_boundaries" is not present, it is inferred to be equal to 0.

"ph_virtual_boundaries_pos_x[i]" specifies the location of the i-th vertical virtual boundary in units of luma samples divided by 8. The value of "ph_virtual_boundaries_pos_x [i]" is in the range of 1 to Ceil(pic_width_in_luma_samples÷8)−1, inclusive.

"ph_virtual_boundaries_pos_y[i]" specifies the location of the i-th horizontal virtual boundary in units of luma samples divided by 8. The value of "ph_virtual_boundaries_pos_y[i]" is in the range of 1 to Ceil(pic_height_in_luma_samples÷8)−1, inclusive.

As described, in applications like 360-degree video, the layout for a specific projection format usually has multiple faces. For example, MPEG-I part 2: omni-directional media format (OMAF) standardizes Cube-map based projection format named CHIP which has six faces. And for those projection formats including a plurality of faces, no matter that kind of compact frame packing arrangement is used, discontinuities appear between two or more adjacent faces in the frame packed picture. If in-loop filtering operations are performed across this discontinuity, face seam artifacts may become visible in the reconstructed video after rendering. To alleviate face seam artifacts, in-loop filtering operations have to be disabled across discontinuities in the frame-packed picture. The virtual boundary can be used across which the loop filtering operation is disabled. An encoder may set the discontinued boundary as a virtual boundary, and thus no loop filter can be applied on the discontinued boundary. Other than the 360-degree video, the virtual boundary may also be used for gradual decoding refresh (GDR), which is mainly used in the very-low-delay application. In the very-low-delay application, inserting an intra coded picture as a random access point picture may cause unacceptable transmission latency due to the big size of the intra coded picture. To reduce the latency, GDR is adopted in which the pictures are refreshed progressively by inserting intra-coded regions in B/P-pictures. To prevent error propagation, the pixels in refreshed region in a picture cannot refer to the those in the un-refreshed region of the current picture or reference picture. Therefore, the loop filtering cannot be applied across the boundary of refreshed region and un-freshed region. With the above virtual boundary scheme, the encoder may set the boundary of refreshed region and un-refreshed region as a virtual boundary, and then no loop filtering operation can be applied across this boundary.

In step 1509, in-loop filtering operations (e.g., look filter stage 232 in FIG. 3A) across the virtual boundary of the pictures is disabled. When there are one or more virtual boundaries signalled in the SPS, the in-loop filtering operations can be disabled across the virtual boundaries in pictures referring to the SPS. In-loop filtering operations include the deblocking, filter, sample adaptive offset filter, and adaptive loop filter operations.

According to some embodiments of the present disclosure, another exemplary method 1600 is provided. The method can be performed by an encoder, one or more software or hardware components of an apparatus (e.g., apparatus 400 of FIG. 4). For example, a processor (e.g., processor 402 of FIG. 4) can perform method 1600. In some embodiments, method 1600 can be implemented by a computer program product, embodied in a computer-readable medium, including computer-executable instructions, such as program code, executed by computers (e.g., apparatus 400 of FIG. 4). The method can include the following steps.

In step 1601, a bitstream comprising a sequence of pictures is received. The sequence of pictures can be a set of pictures. As described, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

In step 1603, whether reference resampling is enabled for the sequence of pictures is determined according to the received bitstream.

In step 1605, in response to the reference resampling being enabled for the sequence of pictures, it is determined that wrap-around motion compensation is disabled for the sequence of pictures.

For example, it is determined that the value of "ref_pic_resampling_enabled_flag" in FIG. 13 is 1, "sps_ref_wrap-around_enabled_flag" is 0 and horizontal wrap-around motion compensation is not applied. "ref_pic_resampling_enabled_flag" specifies whether reference resampling is enabled. The reference resampling is used to resample the reference picture when the resolution of reference picture is different from the resolution of the current picture. At a picture level (e.g., PPS), in this example, when the resolution of the reference picture is difference from the current picture, the wraparound motion compensation is not used to predict the current picture. If it is determined that the value of "ref_pic_resampling_enabled_flag" is 0, "sps_ref_wrap-around_enabled_flag" is 1 and horizontal wrap-around motion compensation is applied.

Accordingly, in step 1703, an alternative step of step 1603, whether a resolution of a reference picture of the sequence of pictures is different from a resolution of a current picture of the sequence of pictures is determined.

In step 1705, an alternative step of step 1605, in response to the resolution of the reference picture of the sequence of pictures is different from the resolution of the current picture of the sequence of pictures, it is determined that wrap-around motion compensation is disabled for the current picture.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The disclosed embodiments may further be described using the following clauses:

1. A method, comprising:
   receiving a set of pictures;
   determining widths and heights of pictures in the set; and
   determining, based on the widths and heights, a position of a virtual boundary for the set of pictures.
2. The method according to clause 1, further comprising:
   determining a minimum value of the determined widths and heights of the pictures, wherein determining, based on the widths and heights, the position of the virtual boundary for the set of pictures further comprises:
   determining, based on the minimum value, the position of the virtual boundary for the set of pictures.
3. The method according to clause 1, further comprising:
   determining a maximum value of the determined widths and heights of the pictures, wherein determining, based on the widths and heights, the position of the virtual boundary for the set of pictures further comprises:
   determining, based on the maximum value, the position of the virtual boundary for the set of pictures.
4. The method according to clause 1, further comprising:
   determining whether a width of a first picture in the set satisfies a given condition; and
   in response to a determination that the width of the first picture satisfies the given condition, disabling horizontal wrap-around motion compensation for the first picture.
5. The method according to clause 1, further comprising:
   disabling in-loop filtering operations across the virtual boundary of the set of pictures.
6. The method according to clause 1, further comprising:
   determining whether a resampling has been performed on a first picture in the set;
   in response to a determination that a resampling has not been performed on the first picture, disabling, for the first picture, at least one of signaling of the virtual boundary or wrap-around motion compensation.
7. The method according to clause 1, wherein
   the position of the virtual boundary is signaled in at least one of a Sequence Parameter Set (SPS) or a Picture Header (PH).
8. An apparatus comprising:
   a memory storing a set of instructions; and
   one or more processors configured to execute the set of instructions to cause the apparatus to perform:
   receiving a set of pictures;
   determining widths and heights of pictures in the set; and
   determining, based on the widths and heights, a position of a virtual boundary for the set of pictures.
9. The apparatus according to clause 8, wherein the one or more processors configured to execute the set of instructions to cause the apparatus to further perform:
   determining a minimum value of the determined widths and heights of the pictures, wherein determining, based on the widths and heights, the position of the virtual boundary for the set of pictures further comprises:
   determining, based on the minimum value, the position of the virtual boundary for the set of pictures.
10. The apparatus according to clause 8, wherein the one or more processors configured to execute the set of instructions to cause the apparatus to further perform:
    determining a maximum value of the determined widths and heights of the pictures, wherein determining, based on the widths and heights, the position of the virtual boundary for the set of pictures further comprises:
    determining, based on the maximum value, the position of the virtual boundary for the set of pictures.
11. The apparatus according to clause 8, wherein the one or more processors configured to execute the set of instructions to cause the apparatus to further perform:
    determining whether a width of a first picture in the set satisfies a given condition; and
    in response to a determination that the width of the first picture satisfies the given condition, disabling horizontal wrap-around motion compensation for the first picture.
12. The apparatus according to clause 8, wherein the one or more processors configured to execute the set of instructions to cause the apparatus to further perform:
    disabling in-loop filtering operations across the virtual boundary of the set of pictures.
13. The apparatus according to clause 8, wherein the one or more processors configured to execute the set of instructions to cause the apparatus to further perform:
    determining whether a resampling has been performed on a first picture in the set;
    in response to a determination that a resampling has not been performed on the first picture, disabling, for the first picture, at least one of signaling of the virtual boundary or wrap-around motion compensation.
14. The apparatus according to clause 8, wherein
    the position of the virtual boundary is signaled in at least one of a Sequence Parameter Set (SPS) or a Picture Header (PH).
15. A non-transitory computer readable medium that stores a set of instructions that is executable by at least one processor of a computer to cause the computer to perform a video processing method, the method comprising:

receiving a set of pictures;
determining widths and heights of pictures in the set; and
determining, based on the widths and heights, a position of a virtual boundary for the set of pictures.
16. The non-transitory computer readable medium according to clause 15, wherein the set of instructions that is executable by the computer to cause the computer to further perform:
determining a minimum value of the determined widths and heights of the pictures, wherein determining, based on the widths and heights, the position of the virtual boundary for the set of pictures further comprises:
determining, based on the minimum value, the position of the virtual boundary for the set of pictures.
17. The non-transitory computer readable medium according to clause 15, wherein the set of instructions that is executable by the computer to cause the computer to further perform:
determining a maximum value of the determined widths and heights of the pictures, wherein determining, based on the widths and heights, the position of the virtual boundary for the set of pictures further comprises:
determining, based on the maximum value, the position of the virtual boundary for the set of pictures.
18. The non-transitory computer readable medium according to clause 15, wherein the set of instructions that is executable by the computer to cause the computer to further perform:
determining whether a width of a first picture in the set satisfies a given condition; and
in response to a determination that the width of the first picture satisfies the given condition, disabling horizontal wrap-around motion compensation for the first picture.
19. The non-transitory computer readable medium according to clause 15, wherein the set of instructions that is executable by the computer to cause the computer to further perform:
disabling in-loop filtering operations across the virtual boundary of the set of pictures.
20. The non-transitory computer readable medium according to clause 15, wherein the set of instructions that is executable by the computer to cause the computer to further perform:
determining whether a resampling has been performed on a first picture in the set;
in response to a determination that a resampling has not been performed on the first picture, disabling, for the first picture, at least one of signaling of the virtual boundary or wrap-around motion compensation.
21. The non-transitory computer readable medium according to clause 15, wherein the position of the virtual boundary is signaled in at least one of a Sequence Parameter Set (SPS) or a Picture Header (PH).

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:
1. A video decoding method, comprising:
receiving a bitstream associated with a set of pictures;
determining, according to the received bitstream, whether a resolution of a first picture in the set of pictures is different from a resolution of a reference picture associated with the first picture;
in response to the resolution of the first picture being different from the resolution of the reference picture associated with the first picture, determining that wrap-around motion compensation is disabled for the first picture;
determining, according to the received bitstream, whether a virtual boundary is signaled at a sequence level for the set of pictures; and
controlling in-loop filtering operations based on whether the virtual boundary is signaled at the sequence level;
wherein the controlling of the in-loop filtering operations comprises:
in response to the virtual boundary being signaled at the sequence level, determining a position of the virtual boundary for the set of pictures, the position being bounded by a range signaled in the received bitstream; and disabling in-loop filtering operations across the virtual boundary, wherein the range by which the position is bounded comprises at least one of a vertical range or a horizontal range, the vertical range is less than or equal to a first value associated with a maximum width of each picture of the set of pictures, the maximum width being signaled in the received bitstream, and the horizontal range is less than or equal to a second value associated with a maximum height of each picture of the set of pictures, the maximum height being signaled in the received bitstream.

2. The method according to claim 1, wherein the first value is equal to Ceil(pic_width_max_in_luma_samples÷8)−1 and the second value is equal to Ceil(pic_height_max_in_luma_samples÷8)−1, and wherein pic_width_max_in_luma_samples represents the maximum width, in units of luma samples, of each picture of the set of pictures, and pic_height_max_in_luma_samples represents the maximum height, in units of luma samples, of each picture of the set of pictures.

3. The method according to claim 1, wherein determining, according to the received bitstream, whether the virtual boundary is signaled at the sequence level comprises:

determining, according to the received bitstream, whether the resolution of the first picture is allowed to be changed; and in response to the resolution of the first picture being allowed to be changed, determining that the virtual boundary is not signaled at the sequence level.

4. The method according to claim 3, further comprising:

in response to the resolution of the first picture being allowed to be changed, determining that wrap-around motion compensation is disabled for the set of pictures.

5. A non-transitory computer readable medium that stores a bitstream of a set of pictures for processing according to a method comprising:

determining, according to the bitstream, whether a resolution of a first picture in the set of pictures is different from a resolution of a reference picture associated with the first picture;

in response to the resolution of the first picture being different from the resolution of the reference picture associated with the first picture, determining that wrap-around motion compensation is disabled for the first picture;

determining whether the bitstream signals a virtual boundary at a sequence level for the set of pictures;

in response to the bitstream signaling the virtual boundary at the sequence level, determining a position of the virtual boundary for the set of pictures, the position being bounded by a range signaled in the bitstream; and disabling in-loop filtering operations across the virtual boundary, wherein the range signaled in the bitstream comprises at least one of a vertical range or a horizontal range, the vertical range is less than or equal to a first value associated with a maximum width of each picture of the set of pictures, the maximum width being signaled in the bitstream, and the horizontal range is less than or equal to a second value associated with a maximum height of each picture of the set of pictures, the maximum height being signaled in the bitstream.

6. The non-transitory computer readable medium according to claim 5, wherein the first value is equal to Ceil(pic_width_max_in_luma_samples÷8)−1 and the second value is equal to Ceil(pic_height_max_in_luma_samples÷8)−1, and wherein pic_width_max_in_luma_samples represents the maximum width, in units of luma samples, of each picture of the set of pictures, and pic_height_max_in_luma_samples represents the maximum height, in units of luma samples, of each picture of the set of picture.

7. The non-transitory computer readable medium according to claim 5, wherein the bitstream comprises:

a flag indicating whether the resolution of the first picture is allowed to be changed; and wherein the method further comprises:

in response to the flag indicating the resolution of the first picture being allowed to be changed, determining that the virtual boundary is not signaled at the sequence level.

8. The non-transitory computer readable medium according to claim 7, wherein the method further comprises:

in response to the flag indicating the resolution of the first picture being allowed to be changed, determining that wrap-around motion compensation is disabled for the set of pictures.

9. The non-transitory computer readable medium according to claim 5, wherein the set of instructions that is executable by the computer to cause the computer to further perform:

in response to that the bitstream does not signal the virtual boundary at the sequence level, determining whether the bitstream signals the virtual boundary at a picture level for one or more pictures in the set, in response to that the bitstream signals the virtual boundary at the picture level for the one or more pictures in the set, determining a position of the virtual boundary for the one or more pictures.

10. A video encoding method, comprising:

setting a virtual boundary for a set of pictures;

disabling in-loop filtering operations across the virtual boundary;

determining whether a resolution of a first picture in the set of pictures is different from a resolution of a reference picture associated with the first picture;

in response to the resolution of the first picture being different from the resolution of the reference picture associated with the first picture, disabling wrap-around motion compensation for the first picture; and signaling, in a bitstream, a maximum value indicative of a range by which a position of the virtual boundary is bounded, wherein the range comprises at least one of a vertical range or a horizontal range, and the maximum value comprises at least one of a maximum width of each picture of the set of pictures or a maximum height of each picture of the set of pictures, wherein:

the vertical range is less than or equal to a first value associated with the maximum width, and the horizontal range is less than or equal to a second value associated with the maximum height.

11. The method according to claim 10, wherein the first value is equal to Ceil(pic_width_max_in_luma_samples÷8)−1 and the second value is equal to Ceil(pic_height_max_in_luma_samples÷8)−1, and wherein pic_width_max_in_luma_samples represents the maximum width, in units of luma samples, of each picture of the set of pictures, and pic_height_max_in_luma_samples represents the maximum height, in units of luma samples, of each picture of the set of pictures.

12. The method according to claim 10, further comprising:

determining whether the resolution of the first picture is allowed to be changed; and in response to the resolution of the first picture being not allowed to be changed, signaling the virtual boundary at to sequence level, or in response to the resolution of the first picture being allowed to be changed, skipping signaling of the virtual boundary at the sequence level.

13. The method according to claim 12, further comprising:

in response to the resolution of the first picture being allowed to be changed, disabling the wrap-around motion compensation for the set of pictures.

* * * * *